US012749985B2

(12) United States Patent
Kawai

(10) Patent No.: US 12,749,985 B2
(45) Date of Patent: Sep. 29, 2026

(54) POWER CONVERSION DEVICE

(71) Applicant: Mitsubishi Electric Corporation, Tokyo (JP)

(72) Inventor: Yu Kawai, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 103 days.

(21) Appl. No.: 18/857,606

(22) PCT Filed: Apr. 26, 2022

(86) PCT No.: PCT/JP2022/018941
§ 371 (c)(1),
(2) Date: Oct. 17, 2024

(87) PCT Pub. No.: WO2023/209821
PCT Pub. Date: Nov. 2, 2023

(65) Prior Publication Data
US 2025/0260328 A1 Aug. 14, 2025

(51) Int. Cl.
*H02M 3/335* (2006.01)
*H02M 1/00* (2007.01)

(52) U.S. Cl.
CPC ... *H02M 3/33573* (2021.05); *H02M 3/33576* (2013.01); *H02M 3/33584* (2013.01); *H02M 1/0043* (2021.05)

(58) Field of Classification Search
CPC ........... H02M 1/0043; H02M 3/33573; H02M 3/33576; H02M 3/33584
See application file for complete search history.

(56) References Cited

U.S. PATENT DOCUMENTS

2008/0094859 A1* 4/2008 Takayanagi ....... H02M 7/53871 363/17
2017/0005584 A1* 1/2017 Guepratte ......... H02M 3/33561
(Continued)

FOREIGN PATENT DOCUMENTS

JP 2018-157643 A 10/2018
JP 2019-106839 A 6/2019
(Continued)

OTHER PUBLICATIONS

International Search Report and Written Opinion mailed on Jul. 12, 2022, received for International Application No. PCT/JP2022/018941, filed on Apr. 26, 2022, 9 pages including English Translation.
(Continued)

*Primary Examiner* — Jue Zhang
(74) *Attorney, Agent, or Firm* — XSENSUS LLP

(57) ABSTRACT

At least one of the N DC voltage terminals is connected to a DC power supply. The converter includes: a multi-winding transformer having N (N≥3) windings; and N full-bridge circuits each having a first leg, a second leg, and a reactor and each being connected to a corresponding power supply and a corresponding winding. The switching control unit switches switching elements in the first leg and the second leg included in each of M (N−1≥M≥1) full-bridge circuits among the N full-bridge circuits, switches switching elements in the second leg included in each of remaining (N−M) full-bridge circuits, and stops switching of switching elements in the first leg in each of the remaining (N−M) full-bridge circuits.

7 Claims, 27 Drawing Sheets

(56) References Cited

U.S. PATENT DOCUMENTS

| | | | | |
|---|---|---|---|---|
| 2019/0190393 | A1* | 6/2019 | Murakami | H02M 3/33561 |
| 2021/0155100 | A1* | 5/2021 | Khaligh | B60L 55/00 |
| 2022/0045618 | A1* | 2/2022 | Kumar | H02M 1/008 |
| 2022/0123661 | A1 | 4/2022 | Ishibashi et al. | |
| 2023/0402927 | A1 | 12/2023 | Kawai | |

FOREIGN PATENT DOCUMENTS

| | | | |
|---|---|---|---|
| JP | 2021-166431 | A | 10/2021 |
| JP | 6964825 | B1 | 11/2021 |
| WO | 2020/152745 | A1 | 7/2020 |

OTHER PUBLICATIONS

Notification of Reason for Refusal mailed on Sep. 5, 2023, received for JP Application 2023-533361, 17 pages including English Translation.

* cited by examiner

| REF1-REF2 | REF1 | |
|---|---|---|
| | SMALL | LARGE |
| ZERO | DISCHARGE MODE 2 | DISCHARGE MODE 5 |
| POSITIVE | DISCHARGE MODE 1, 3, 4 | DISCHARGE MODE 3, 4 |

| REF1-REF2 | REF2 | |
|---|---|---|
| | SMALL | LARGE |
| NEGATIVE | DISCHARGE MODE 1, 3, 4 | DISCHARGE MODE 3, 4 |
| ZERO | DISCHARGE MODE 2 | DISCHARGE MODE 5 |

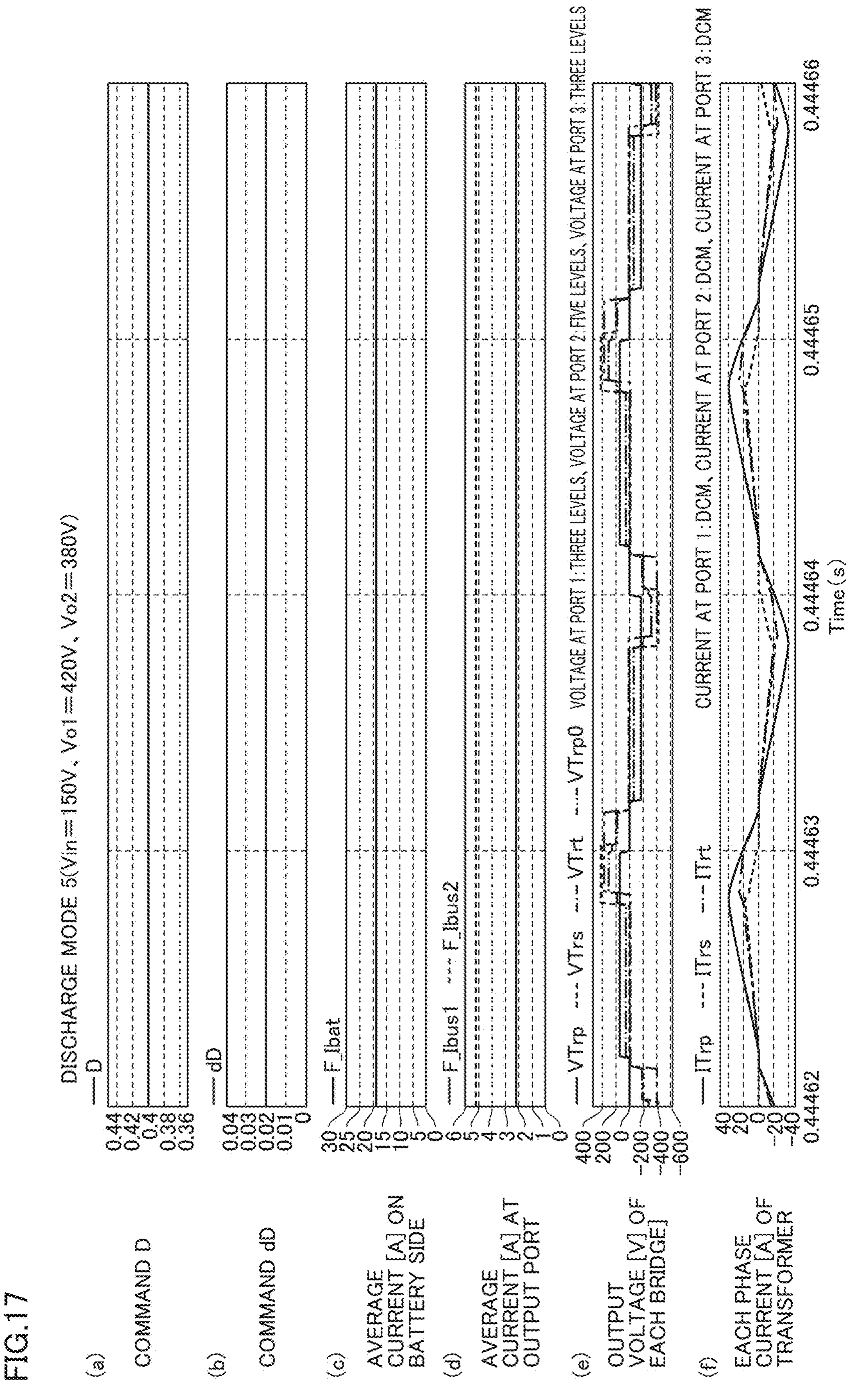
FIG.17
DISCHARGE MODE 5(Vin=150V, Vo1=420V, Vo2=380V)
(a) COMMAND D
D
(b) COMMAND dD
dD
(c) AVERAGE CURRENT [A] ON BATTERY SIDE
F_Ibat
(d) AVERAGE CURRENT [A] AT OUTPUT PORT
F_Ibus1
F_Ibus2
(e) OUTPUT VOLTAGE [V] OF EACH BRIDGE
VTrp
VTrs
VTrt
VTrp0
VOLTAGE AT PORT 1:THREE LEVELS, VOLTAGE AT PORT 2:FIVE LEVELS, VOLTAGE AT PORT 3:THREE LEVELS
(f) EACH PHASE CURRENT [A] OF TRANSFORMER
ITrp
ITrs
ITrt
CURRENT AT PORT 1:DCM, CURRENT AT PORT 2:DCM, CURRENT AT PORT 3:DCM
Time(s)

POWER CONVERSION DEVICE

CROSS-REFERENCE TO RELATED APPLICATION

This application is a national stage application, pursuant to 35 U.S.C. § 371, of International Patent Application No. PCT/JP2022/018941, filed Apr. 26, 2022, the entire contents of which are incorporated herein by reference.

TECHNICAL FIELD

The present disclosure relates to a power conversion device.

BACKGROUND ART

There has been known a direct-current (DC)/DC conversion device in which a full bridge is connected to each phase of a multi-winding transformer. For example, a power conversion device disclosed in PTL 1 has the following configuration. A multi-winding transformer (40) has a primary-side winding (41) and a plurality of secondary-side windings (42, 43). A primary-side bridge circuit (12) that performs DC/alternating-current (AC) power conversion is connected between a primary-side DC terminal (11) connected to a DC power supply (10) and the primary-side winding (41). A plurality of secondary-side bridge circuits (22, 32) that perform DC/AC power conversion are respectively connected between the plurality of secondary-side windings (42, 43) and the plurality of secondary-side DC terminals (21, 31). The plurality of secondary-side windings include: a first secondary-side winding (42) having the largest magnetic coupling with the primary-side winding (41); and a second secondary-side winding (43) having a magnetic coupling with the primary-side winding (41) that is weaker than the magnetic coupling of the first secondary-side winding (43). In this power conversion device, further, a controller (50) generates pulse outputs that are output from AC terminals (13, 23, 33) and then performs time-division of the pulse outputs according to the voltages at DC terminals (11, 21, 31).

CITATION LIST

Patent Literature

PTL 1: WO2020/152745

SUMMARY OF INVENTION

Technical Problem

In PTL 1, the pulse outputs from the AC terminals (13, 23, 33) are applied to respective phases of the transformer (40) in such a manner that a voltage amplitude is switched for each half period, and thus, the iron loss in the transformer (40) tends to increase. Further, when the output power from the primary-side bridge circuit (12) is small, a high ripple current occurs in the transformer (40), so that a loss occurs in the transformer (40). A larger loss in the transformer (40) makes it more difficult to cool the transformer (40), with the result that a transformer (40) having a larger magnetic core needs to be selected.

Thus, an object of the present disclosure is to provide a power conversion device making it possible to avoid an increase in size of a transformer.

Solution to Problem

A power conversion device according to the present disclosure includes: N DC voltage terminals; a converter; and a switching control unit to control switching of switching elements included in the converter. At least one of the N DC voltage terminals is connected to a DC power supply. The converter includes: a multi-winding transformer having N (N≥3) windings; and N full-bridge circuits each having a first leg, a second leg, and a reactor, each of the N full-bridge circuits being connected to a corresponding one of the DC voltage terminals and a corresponding one of the windings. The switching control unit switches switching elements in the first leg and the second leg, the first leg and the second leg being included in each of M (N−1≥M≥1) full-bridge circuits among the N full-bridge circuits, switches switching elements in the second leg included in each of (N−M) full-bridge circuits that remain, and stops switching of switching elements in the first leg included in each of the (N−M) full-bridge circuits.

Advantageous Effects of Invention

According to the present disclosure, it is possible to avoid an increase in size of the transformer.

BRIEF DESCRIPTION OF DRAWINGS

FIG. 12(*b*) is a diagram illustrating an example of an output current Io1 with respect to REF1 in command pattern A under representative voltage conditions; FIG. 12(*c*) is a diagram illustrating an example of an output current Io2 with respect to REF1 in command pattern A under representative voltage conditions; FIG. 12(*d*) is a diagram illustrating an example of an output current Iin with respect to REF2 in command pattern B under representative voltage conditions; FIG. 12(*e*) is a diagram illustrating an example of an output current Io1 with respect to REF2 in command pattern B under representative voltage conditions; and FIG. 12(*f*) is a diagram illustrating an example of an output current Io2 with respect to REF2 in command pattern B under representative voltage conditions.

FIG. 17 is a diagram illustrating a waveform example of a discharge mode 5 in command pattern A.

DESCRIPTION OF EMBODIMENTS

The following describes embodiments with reference to the accompanying drawings.

First Embodiment

Figure 1:
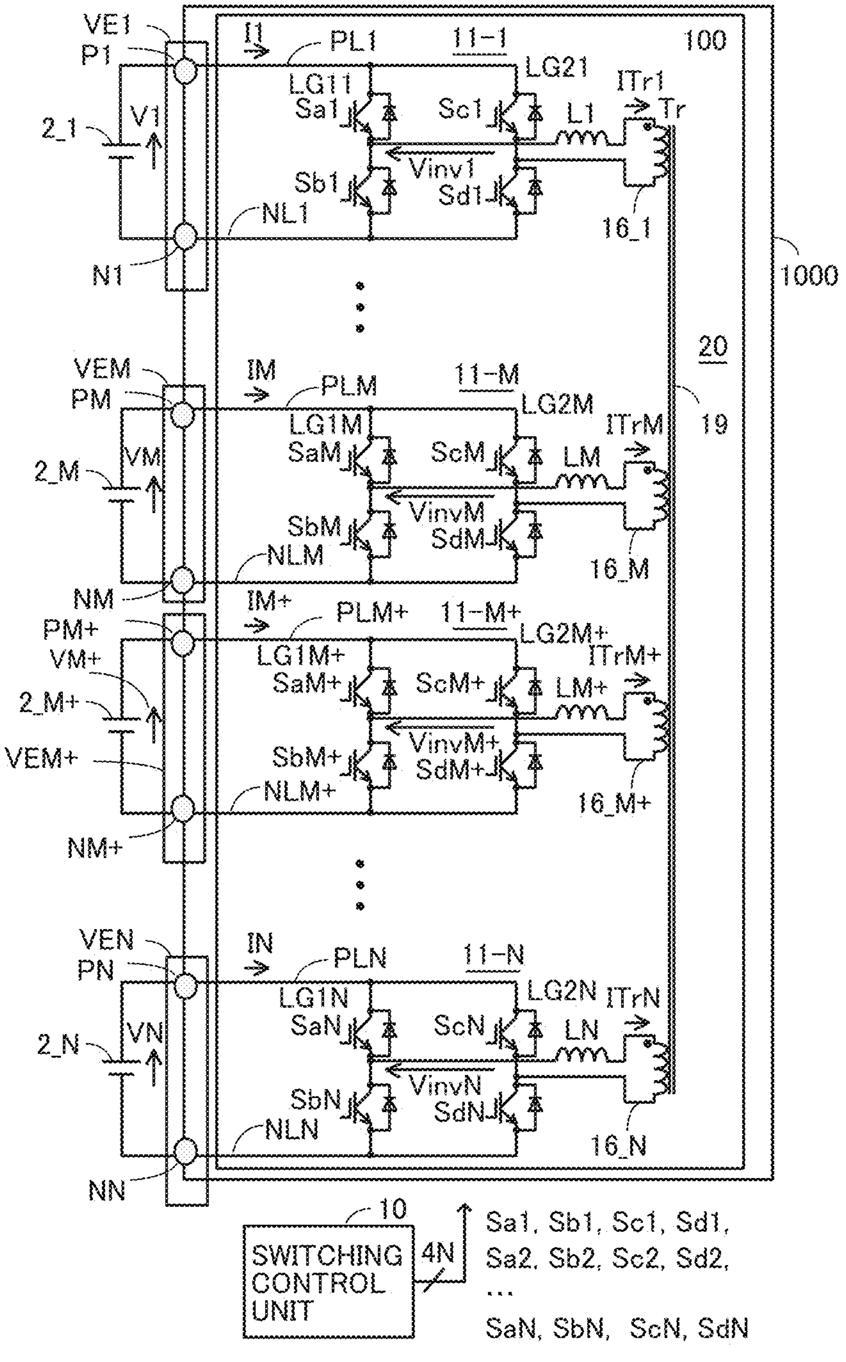
FIG. 1 is a schematic circuit diagram of a power conversion device 1000 according to a first embodiment.

FIG. 1 is a schematic circuit diagram of a power conversion device 1000 according to the first embodiment. Power conversion device 1000 includes an i-th DC voltage terminal VEi (i=1 to N), a converter 100, and a switching control unit 10. A terminal Pi of i-th DC voltage terminal VEi is connected to a positive electrode side of an i-th DC power supply 2-*i*, and a terminal Ni of i-th DC voltage terminal VEi is connected to a negative electrode side of i-th DC power supply 2-*i*. In the present embodiment, i-th DC voltage terminal VEi is connected to i-th DC power supply 2-*i* (i=1 to N), but at least one of the N DC voltage terminals should only be connected to the DC power supply. The voltage of i-th DC power supply 2-*i* is an i-th voltage Vi.

Converter 100 has a double active bridge (DAB) configuration. Converter 100 includes: an i-th full-bridge circuit 11-*i* (i=1 to N) connected to i-th DC power supply 2-*i*; and a multi-winding transformer 20. In FIG. 1, "M+" represents "M+1".

Multi-winding transformer 20 has an i-th winding 16-*i* (i=1 to N). In this case, i-th windings 16-*i* (i=1 to N) are magnetically coupled to each other via a core 19.

Further, i-th full-bridge circuit 11-*i* includes; semiconductor switching elements Sai, Sbi, Sci, and Sdi that are full-bridge connected between i-th winding 16-*i* and power lines PLi, NLi and; an i-th reactor Li. Power line PLi is connected to terminal Pi of i-th DC voltage terminal VEi, and power line NLi is connected to terminal Ni of i-th DC voltage terminal VEi. Reactor Li is connected to i-th winding 16-*i*.

Each of semiconductor switching elements Sai, Shi, Sci, and Sdi constituting i-th full-bridge circuit 11-*i* can be configured, for example, by an insulated gate bipolar transistor (IGBT), a metal-oxide semiconductor field-effect transistor (MOSFET), and the like. In the following, the semiconductor switching element is also simply referred to as a "switching element".

Semiconductor switching elements Sai and Sbi constitute a first leg LG1*i*. Semiconductor switching elements Sci and Sdi constitute a second leg LG2*i*.

In the following, a current flowing between DC power supply 2-*i* and i-th full-bridge circuit 11-*i* is referred to as a current Iin, and a current flowing between i-th full-bridge circuit 11-*i* and i-th winding 16-*i* is referred to as an alternating current ITri.

When electric power is discharged from i-th DC power supply 2-*i*, i-th full-bridge circuit 11-*i* converts an i-th voltage Vi, which is a DC voltage between power lines PLi and NLi, into an AC voltage Vinvi by switching control of semiconductor switching elements Sai, Sbi, Sci, and Sdi. AC voltage Vinvi is transmitted to i-th winding 16-*i* via i-th reactor Li.

When i-th full-bridge circuit 11-*i* charges i-th DC power supply 2-*i* with electric power, AC voltage Vinvi is transmitted from i-th winding 16-*i* to i-th full-bridge circuit 11-*i* via i-th reactor Li. Also, i-th full-bridge circuit 11-*i* converts AC voltage Vinvi into i-th voltage Vi, which is a DC voltage between power lines PLi and NLi, by switching control of semiconductor switching elements Sci and Sdi constituting second leg LG2*i*. Then, i-th full-bridge circuit 11-*i* stops switching of semiconductor switching elements Sai and Sbi constituting first leg LG1*i*, and then fixes the semiconductor switching elements to be off.

The AC output end of i-th full-bridge circuit 11-*i* is electrically insulated and interconnected by multi-winding transformer 20. As a result, among N i-th DC power supplies 2-*i* (i=1 to N), power transmission can be done with insulation through multi-winding transformer 20.

Switching control unit 10 controls the switching operations for semiconductor switching elements Sai, Sbi, Sci, and Sdi (i=1 to N).

Switching control unit 10 switches the semiconductor switching elements in a first leg LG1 and a second leg LG2 included in each of M (N−1≥M≥1) full-bridge circuits among N full-bridge circuits 11-1 to 11-N, switches the semiconductor switching elements in second leg LG2 included in each of the remaining (N−M) full-bridge circuits, and stops the switching of the semiconductor switching elements in first leg LG1 (fixes the semiconductor switching elements to be off) included in each of the remaining (N−M) full-bridge circuits. Thereby, electric power is input to power conversion device 1000 from the DC voltage terminals connected to the M (N−1≥M≥1) full-bridge circuits (i.e., electric power is discharged from each of the DC power supplies connected to the DC voltage terminals), and electric power is output to the outside of power conversion device 1000 from each of the DC voltage terminals connected to the remaining (N−M) full-bridge circuits (i.e., each of the DC power supplies connected to the respective DC voltage terminals is charged with electric power). In some cases, electric power may be exchanged between M (N−1≥M≥1) full-bridge circuits.

Figure 2:
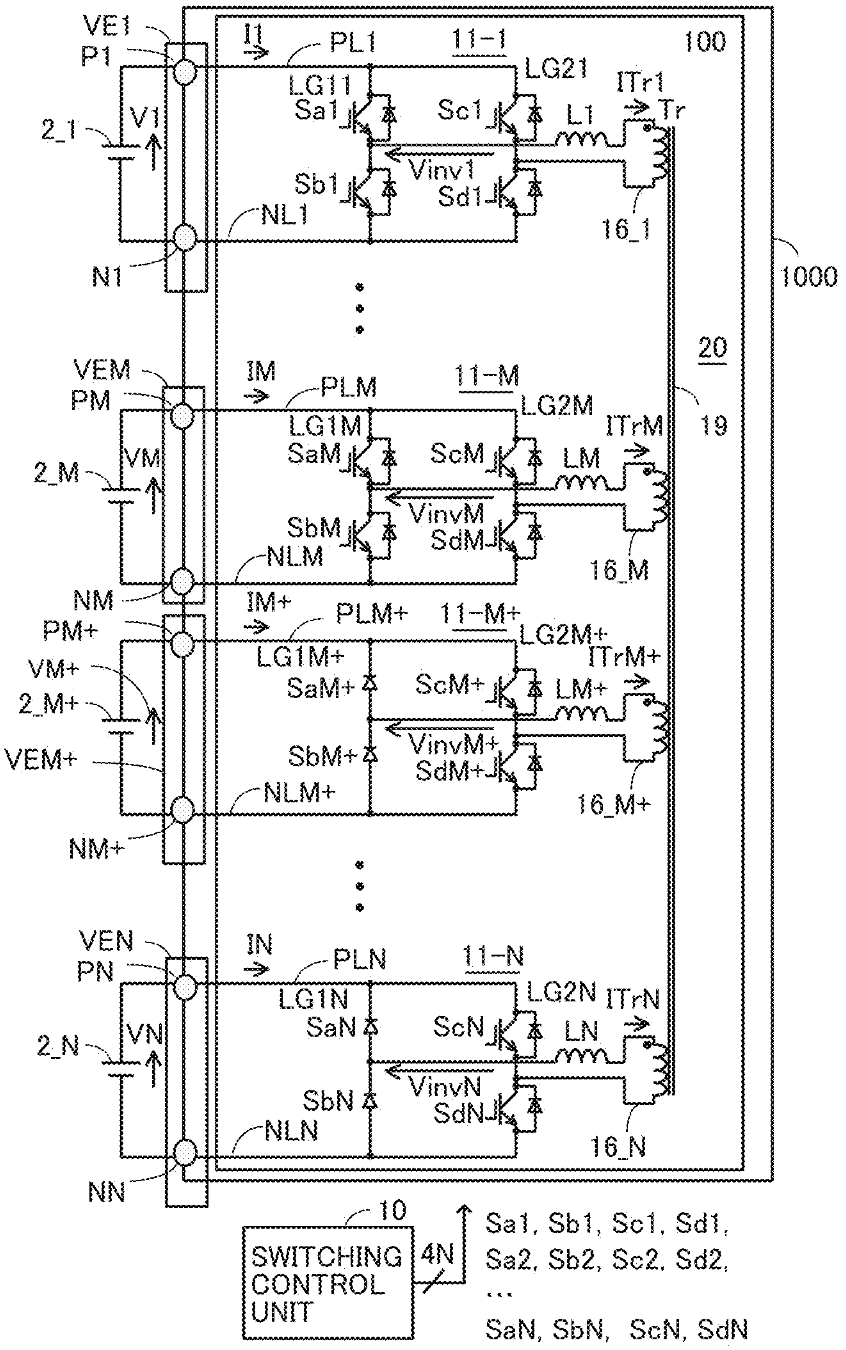
FIG. 2 is a diagram illustrating an equivalent circuit of power conversion device 1000 in a case where electric power is discharged from an i-th DC power supply 2-*i* (i=1 to M) and a j-th DC power supply (j=M+1 to N) is charged with electric power.

FIG. 2 is a diagram illustrating an equivalent circuit of power conversion device 1000 in a case where electric power is discharged from i-th DC power supply 2-*i* (i=1 to M) and j-th DC power supply (j=M+1 to N) is charged with electric power. Electric power is input to power conversion device 1000 from DC voltage terminal VEi (j=1 to M) connected to i-th DC power supply 2-*i* (i=1 to M), and electric power is output to the outside of power conversion device 1000 from a DC voltage terminal VEj (j=M+1 to N) connected to the j-th DC power supply (j=M+1 to N).

As shown in FIG. 2, switching control unit 10 stops the switching operations for semiconductor switching elements Saj and Sbj constituting a first leg LG1*j* included in a j-th full-bridge circuit 11-*j* (j=M+1 to N) (fixes the semiconductor switching elements to be off), and switches the remaining semiconductor switching elements.

Figure 3:
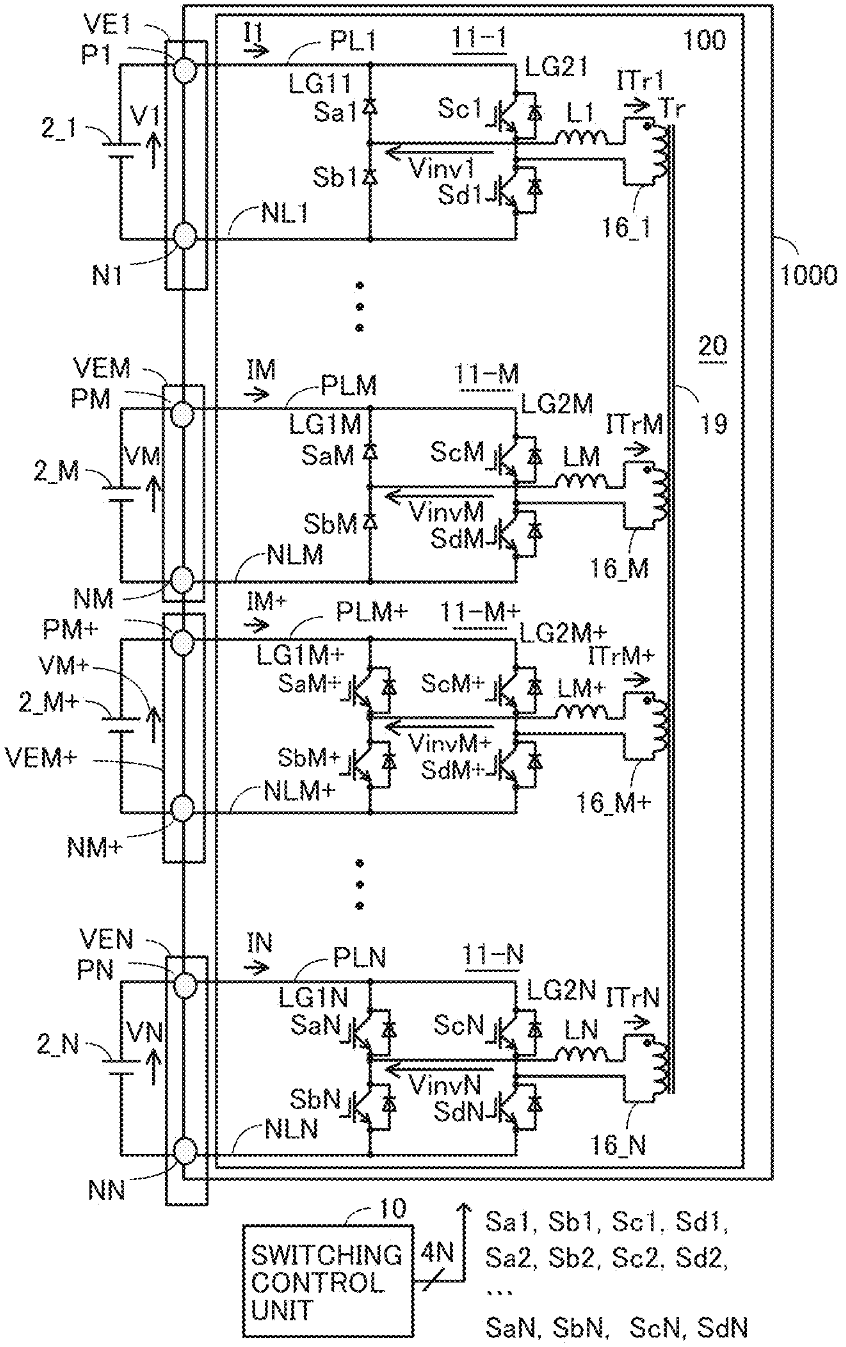
FIG. 3 is a diagram illustrating the equivalent circuit of power conversion device 1000 in a case where i-th DC power supply 2-*i* (i=1 to M) is charged with electric power, and electric power is discharged from the j-th DC power supply (j=M+1 to N).

FIG. 3 is a diagram illustrating the equivalent circuit of power conversion device 1000 in a case where i-th DC power supply 2-*j* (i=1 to M) is charged with electric power, and electric power is discharged from the j-th DC power supply (j=M+1 to N). Electric power is output to the outside of power conversion device 1000 from DC voltage terminal VEi (i=1 to M) connected to i-th DC power supply 2-*i* (i=1 to M), and electric power is input to power conversion device 1000 from DC voltage terminal VEj (j=M+1 to N) connected to the j-th DC power supply (j=M+1 to N).

As shown in FIG. 3, switching control unit 10 stops the switching operations for semiconductor switching elements Sai and Sbi constituting first leg LG1*i* included in i-th full-bridge circuit 11-*i* (j=1 to M) (fixes the semiconductor switching elements to be off), and switches the remaining semiconductor switching elements.

The following describes an operation performed when N=5, electric power is discharged from a first DC power supply 2-1, and each of a second DC power supply 2-2, a third DC power supply DC 2-3, a fourth DC power supply 2-4, and a fifth DC power supply 2-5 is charged with electric power.

Figure 4:
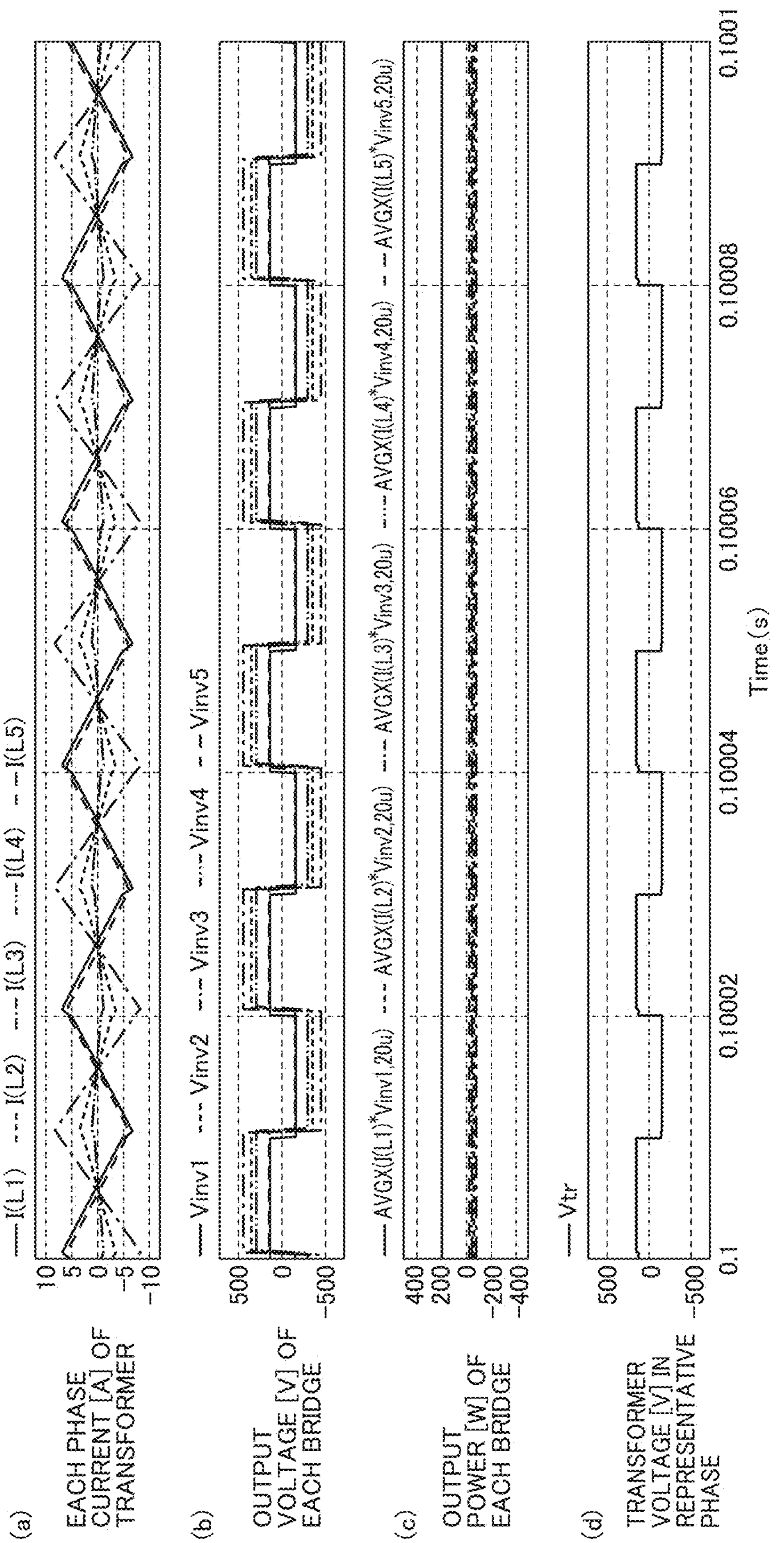
FIG. 4 is a diagram illustrating a waveform example in a case where all of semiconductor switching elements Sai, Sbi, Sci, and Sdi (i=1 to 5) are switched.

FIG. 4 is a diagram illustrating a waveform example in the case where all of semiconductor switching elements Sai, Sbi, Sci, and Sdi (i=1 to 5) are switched.

Figure 5:
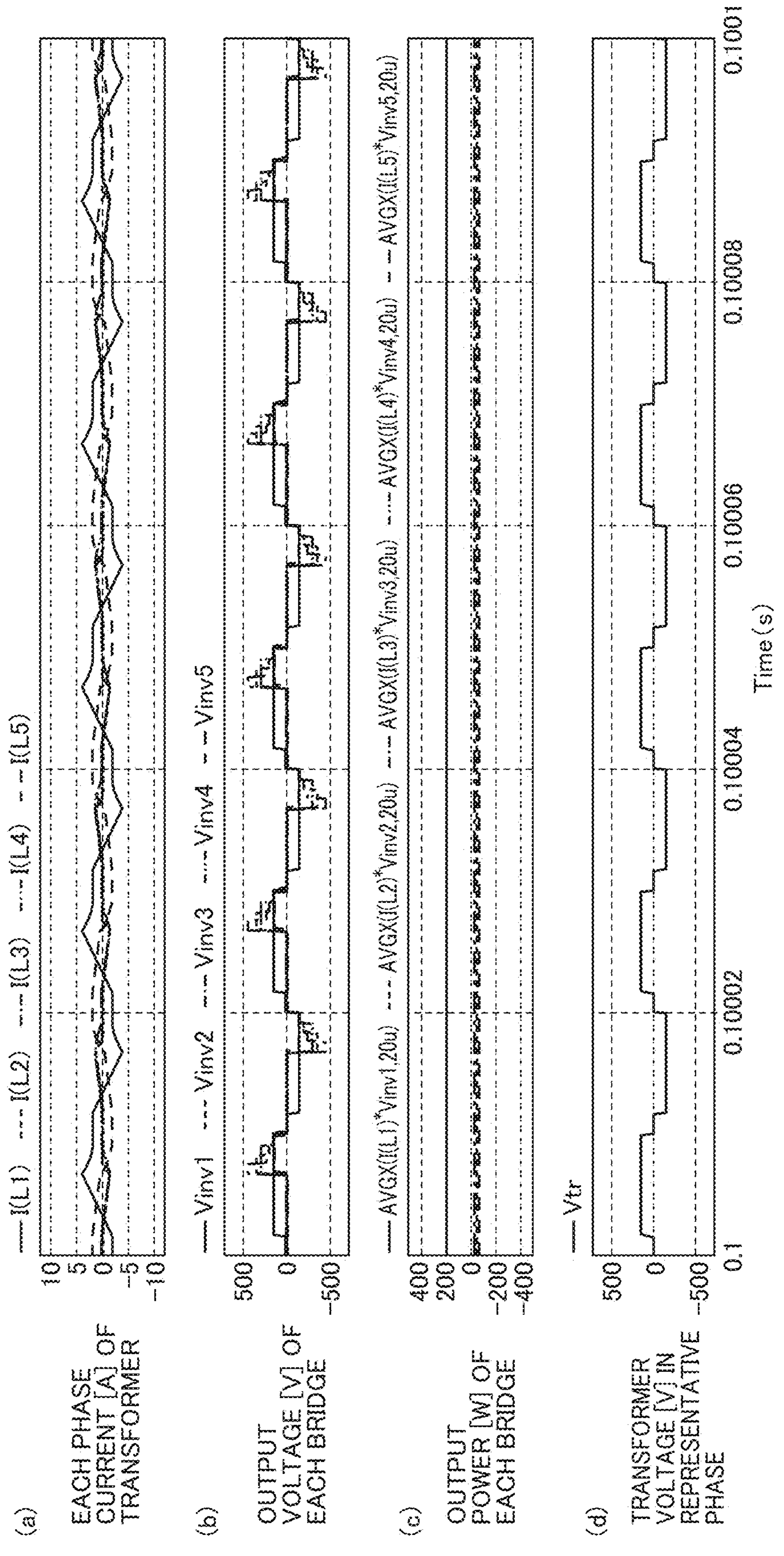
FIG. 5 is a diagram illustrating a waveform example in a case where, among semiconductor switching elements Sai, Sbi, Sci, and Sdi (i=1 to 5), semiconductor switching elements Sai and Sbi (i=2 to 5) are fixed and the remaining semiconductor switching elements are switched.

FIG. 5 is a diagram illustrating a waveform example in the case where, among semiconductor switching elements Sai, Sbi, Sci, and Sdi (i=1 to 5), semiconductor switching elements Sai and Sbi (i=2 to 5) are fixed while the remaining semiconductor switching elements are switched.

The comparison between the waveform in FIG. 4 and the waveform in FIG. 5 shows that fixing the states of semiconductor switching elements Sai and Sbi (i=2 to 5) makes it possible to reduce the time product of the transformer voltage in a representative phase and the peak value of the transformer current.

According to the present embodiment, the circulating power in a transformer of an insulated converter having the same number of DC buses as the number of phases in the multi-winding transformer can be suppressed, so that the loss in the transformer can be reduced. As a result, the power conversion device can be reduced in size.

According to the present embodiment, the current generated in the multi-winding transformer of each charge-side full-bridge circuit becomes a zero current after reception of the energy stored in the multi-winding transformer because one leg in the corresponding full-bridge circuit is stopped. Thereby, in the charge-side full-bridge circuit, no charging operation occurs on a DC bus within a carrier period, which makes it possible to suppress reactive power (the above-mentioned circulating power) by which electric power obtained by the charging operation is returned to a discharge-side full-bridge circuit.

Further, in the configuration for which no countermeasures has yet been taken (in the case where one leg in the charge-side full-bridge circuit is not stopped), the circulating power occurs also among the charge-side full-bridge circuits, and thus, a loss occurs due to wasteful power supply and reception via the multi-winding transformer. By stopping one leg in the charge-side full-bridge circuit, wasteful circulating power occurring in the multi-winding transformer can be suppressed. As a result, the multi-winding transformer can be reduced in size by reducing the iron loss resulting from power supply and reception between the charge-side full-bridge circuit and the discharge-side full-bridge circuit and also by reducing the copper loss resulting from the circulating current (circulating power) among all of the full-bridge circuits.

According to the present embodiment, since a loss during a low output is small, a low loss can be implemented in a wide power range in an intended use in which the electric power for charging/discharging is desired to be adjusted according to the charging rate, for example, for the purpose of prolonging the useful life of a battery.

Second Embodiment

Figure 6:
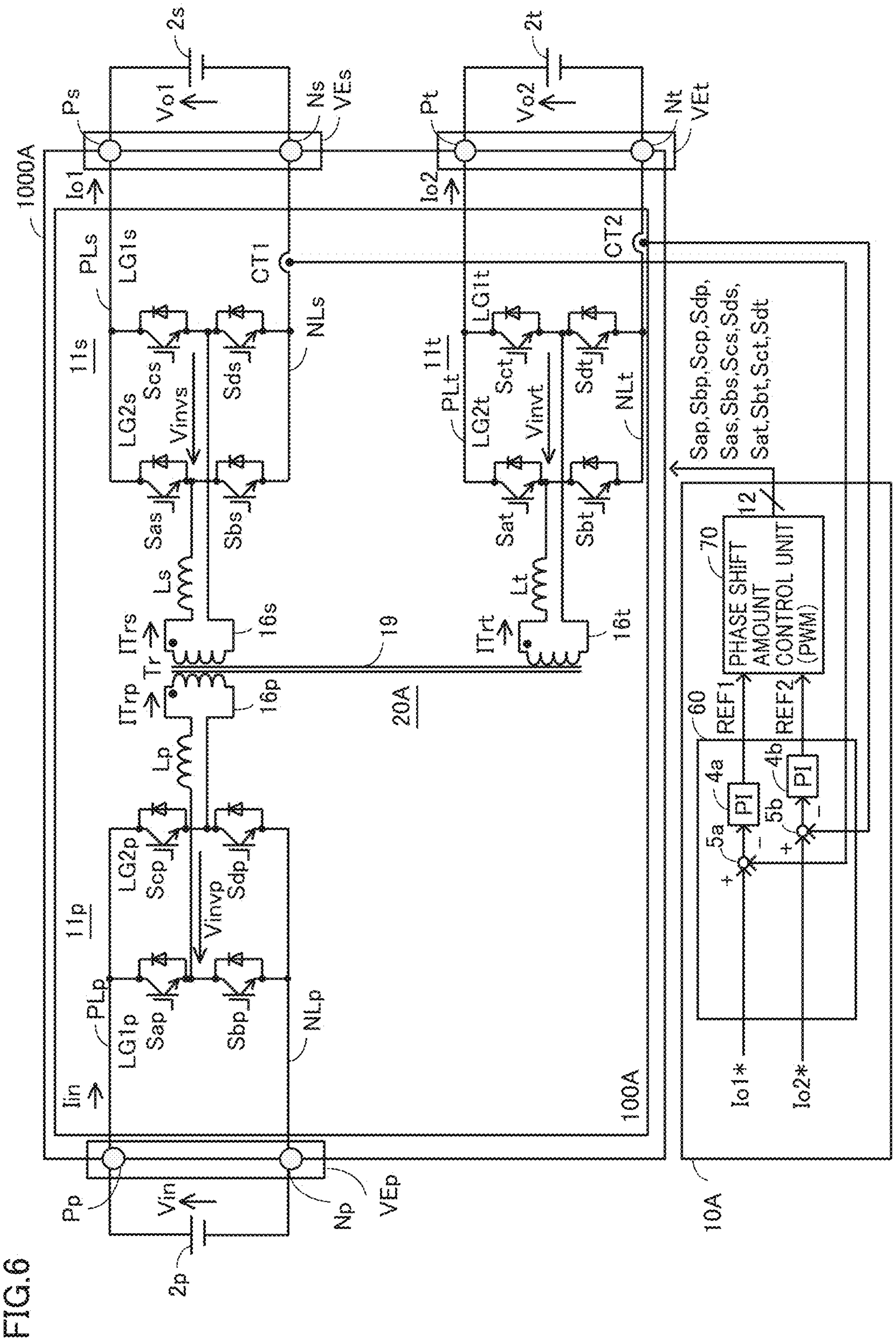
FIG. 6 is a schematic circuit diagram of a power conversion device 1000A according to a second embodiment.

FIG. 6 is a schematic circuit diagram of a power conversion device 1000A according to the second embodiment.

Power conversion device 1000A includes a first DC voltage terminal VEp, a second DC voltage terminal VEs, a third DC voltage terminal VEt, a converter 100A, and a switching control unit 10A.

A terminal Pp of first DC voltage terminal VEp is connected to the positive electrode side of a first DC power supply 2*p*, and a terminal Np of first DC voltage terminal VEp is connected to the negative electrode side of first DC power supply 2*p*. A terminal Ps of second DC voltage terminal VEs is connected to the positive electrode side of a second DC power supply 2*s*, and a terminal Ns of second DC voltage terminal VEs is connected to the negative electrode side of second DC power supply 2*s*. A terminal Pt of third DC voltage terminal VEt is connected to the positive electrode side of a third DC power supply 21, and a terminal Nt of third DC voltage terminal VEt is connected to the negative electrode side of third DC power supply 2*t*.

The voltage at first DC power supply 2*p* and first DC voltage terminal VEp is Vin. Current Iin flows through first DC power supply 2*p* and first DC voltage terminal VEp. The voltage at second DC power supply 2*s* and second DC voltage terminal VEs is Vo1. A current Io1 flows through second DC power supply 2*s* and second DC voltage terminal VEs. The voltage at third DC power supply 2*t* and third DC voltage terminal VEt is Vo2. A current Io2 flows through third DC power supply 2*t* and third DC voltage terminal VEt.

Converter 100A performs DC/DC conversion involving power transmission from first DC power supply 2*p* to second DC power supply 2*s* and third DC power supply 2*t* (i.e., from first DC voltage terminal VEp to second DC voltage terminal VEs and third DC voltage terminal VEt) or performs DC/DC conversion involving power transmission from second DC power supply 2*s* and third DC power supply 2*t* to first DC power supply 2*p* (i.e., from second DC voltage terminal VEs and third DC voltage terminal VEt to first DC voltage terminal VEp).

Converter 100A includes: a first full-bridge circuit 11*p* connected to first DC voltage terminal VEp; a second full-bridge circuit 11*s* connected to second DC voltage terminal VEs; a third full-bridge circuit 11*t* connected to third DC voltage terminal VEt; and a multi-winding transformer 20A. Multi-winding transformer 20A includes a first winding 16*p* as a primary winding, a second winding 16*s* as a secondary winding, and a third winding 16*t* as a secondary winding. First winding 16*p*, second winding 16*s*, and third winding Hot are magnetically coupled to each other via core 19.

First full-bridge circuit 11*p* includes: semiconductor switching elements Sap, Sbp, Scp, and Sdp (Sap to Sdp) that are full-bridge connected between first winding 16*p* and power lines PLp, NLp; and a reactor Lp. Power lines PLp and NLp are connected to terminals Pp and Np, respectively, of first DC voltage terminal VEp. Current Ii1 flowing through first DC power supply 2*p* and first DC voltage terminal VEp flows between power line PLp and first full-bridge circuit 11*p* and also between power line NLp and first full-bridge circuit 11*p*. Reactor Lp is connected to first winding 16*p*. Semiconductor switching elements Sap and Sbp constitute a first leg LG1*p*. Semiconductor switching elements Scp and Sdp constitute a second leg LG2*p*.

When electric power is discharged from first DC power supply 2*p* (i.e., when electric power is output from first DC power supply 2*p* to first DC voltage terminal VEp), first full-bridge circuit 11*p* converts DC voltage Vin between power lines PLp and NLp into an AC voltage Vinvp by switching control of semiconductor switching elements Sap to Sdp. AC voltage Vinvp is transmitted to first winding 16*p* via reactor Lp. An alternating current ITrp flows between first full-bridge circuit 11*p* and first winding 16*p*.

When first DC power supply 2*p* is charged with electric power (i.e., when electric power is output from first DC voltage terminal VEp to first DC power supply 2*p*), first full-bridge circuit 11*p* converts AC voltage Vinvp into DC voltage Vin between power lines PLp and NLp by switching control of semiconductor switching elements Sap to Sdp. An AC voltage Vinvsp is transmitted from first winding 16*p* to first full-bridge circuit 11*p* via reactor Lp. Alternating current ITrp flows between first winding 16*p* and first full-bridge circuit 11*p*. First full-bridge circuit 11*p* stops switching of semiconductor switching elements Sap and Sbp constituting first leg LG1*p* and fixes semiconductor switching elements Sap and Sbp to be off.

Second full-bridge circuit 11*s* includes: semiconductor switching elements Sas, Sbs, Scs, and Sds (Sas to Sds) that are full-bridge connected between second winding 16*s* and power lines PLs, NLs, and a reactor Ls. Power lines PLs and NLs are connected to terminals Ps and Ns, respectively, of second DC voltage terminal VEs. Current Io1 flowing through second DC power supply 2*s* and second DC voltage terminal VEs flows between power line PLs and second full-bridge circuit 11*s* and also between power line NLs and second full-bridge circuit 11*s*. Reactor Ls is connected to second winding 16*s*. Semiconductor switching elements Sas and Sbs constitute a first leg LG1*s*. Semiconductor switching elements Scs and Sds constitute a second leg LG2*s*.

When electric power is discharged from second DC power supply 2*s* (i.e., when electric power is output from second DC power supply 2*s* to second DC voltage terminal VEs), second full-bridge circuit 11*s* converts first voltage Vo1 between power lines PLs and NLs into AC voltage Vinvs by switching control of semiconductor switching elements Sas to Sds. An AC voltage Vinvs is transmitted to second winding 16*s* via reactor Ls. An AC current ITrs flows between second full-bridge circuit 11*s* and second winding 16*s*.

When second DC power supply 2*s* is charged with electric power (i.e., when electric power is output from second DC voltage terminal VEs to second DC power supply 2*s*), second full-bridge circuit 11*s* converts AC voltage Vinvs into first voltage Vo1, which is a DC voltage between power lines PLs and NLs, by switching control of semiconductor switching elements Sas to Sds. AC voltage Vinvs is transmitted from second winding 16*s* to second full-bridge circuit 11*s* via reactor Ls. Alternating current ITrs flows between second winding 16*s* and second full-bridge circuit 11*s*. Second full-bridge circuit 11*s* stops switching of semiconductor switching elements Sas and Sbs constituting first leg LG1*s* and then fixes semiconductor switching elements Sas and Sbs to be off.

Third full-bridge circuit 11*t* includes: semiconductor switching elements Sat, Sbt, Sct, and Sdt (Sat to Sdt) that are full-bridge connected between third winding 16*t* and power lines PLt, NLt; and a reactor Lt. Power lines PLt and NLt are connected to terminals Pt and Nt, respectively, of third DC voltage terminal VEt. Current Io2 flowing through third DC power supply 2*t* and third DC voltage terminal VEt flows between power line PLt and third full-bridge circuit 11*t* and also between power line NLt and third full-bridge circuit 11*t*. Reactor Lt is connected to third winding 16*t*. Semiconductor switching elements Sat and Sbt constitute a first leg LG1*t*. Semiconductor switching elements Sct and Sdt constitute a second leg LG2*t*.

When electric power is discharged from third DC power supply 2*t* (i.e., when electric power is output from third DC power supply 2*t* to third DC voltage terminal VEt), third full-bridge circuit 11*t* converts second voltage Vo2 between power lines PLt and NLt into an AC voltage Vinvt by switching control of semiconductor switching elements Sat to Sdt. AC voltage Vinvt is transmitted to third winding 16*t* via reactor Lt. An alternating current ITrt flows between third full-bridge circuit 11*t* and third winding 16*t*.

When third DC power supply 2*t* is charged with electric power (i.e., when electric power is output from third DC voltage terminal VEt to third DC power supply 2*t*), third full-bridge circuit 11*t* converts AC voltage Vinvt into second voltage Vo2, which is a DC voltage between power lines PLt and NLt, by switching control of semiconductor switching elements Sat to Sdt. AC voltage Vinvt is transmitted from third winding 16*t* to third full-bridge circuit 11*t* via reactor Lt. Alternating current ITrt flows between third winding 16*t* and third full-bridge circuit 11*t*. Third full-bridge circuit 11*t* stops switching of semiconductor switching elements Sat and Sbt constituting first leg LG1*t* and then fixes semiconductor switching elements Sat and Sbt to be off.

A current detector CT1 detects current Io1 flowing through second DC power supply 2*s* and second DC voltage terminal VEs. A current detector CT2 detects current Io2 flowing through third DC power supply 2*t* and third DC voltage terminal VEt.

Each of reactors Lp, Ls, and Lt may be configured by connection of reactor elements, or can also be configured by a leakage inductance on each of first winding 16*p*, second winding 16*s*, and third winding 16*t*.

The AC output ends of first full-bridge circuit 11*p*, second full-bridge circuit 11*s*, and third full-bridge circuit 11*t* are electrically insulated and interconnected by multi-winding transformer 20A. As a result, among first DC power supply 2*p*, second DC power supply 2*s*, and third DC power supply 2*t*, power transmission can be done with insulation through multi-winding transformer 20A. Converter 100A allows bidirectional power conversion, i.e., both power transmission from first DC power supply 2*p* to second DC power supply 2*s* and third DC power supply 2*t* (the first DC power supply discharging operation), and power transmission from second DC power supply 2*s* and third DC power supply 2*t* to first DC power supply 2*p* (the first DC power supply charging operation). During the first DC power supply charging operation, electric power may be transmitted and received between second full-bridge circuit 11*s* and third full-bridge circuit 11*t*.

Each of the semiconductor switching elements constituting each of first full-bridge circuit 11*p*, second full-bridge circuit 11*s*, and third full-bridge circuit 11*t* can be configured, for example, by an IGBT, a MOSFET, and the like. In the following, the semiconductor switching element is also simply referred to as a "switching element".

When the control systems of Io1 and Io2 are nonlinear systems, it is difficult to implement a higher bandwidth of the current control system. When DC power supplies 2*p*, 2*s*, and 2*t* are targets subjected to voltage control, passive components such as smoothing capacitors need to be increased in size.

In the present embodiment, as described below, it is possible to suppress the circulating power in the transformer of the insulated converter having the same number of DC bases as the number of phases in the multi-winding transformer, and also possible to reduce the size of each passive component by quantitatively adjusting the power sharing while alleviating the nonlinearity of the current control system.

Switching control unit 10A controls first current Io1 and second current Io2 with the use of detection values from current detectors CT1 and CT2. In the configuration example in FIG. 6, switching control unit 10A controls converter 100A such that first current Io1 becomes close to a first current target value Io1* and second current Io2 becomes close to a second current target value Io2*.

Specifically, switching control unit 10A includes a current control unit 60 and a phase shift amount control unit 70. Current control unit 60 includes subtractors 5*a* and 5*b* and PI control units 4*a* and 4*b*.

Subtractor 5*a* subtracts detection value Io1 of current detector CT1 from first current target value Io1* to calculate a first current deviation ΔIo1=Io1*−Io1. Subtractor 5*b* subtracts detection value Io2 of current detector CT2 from second current target value Io2* to calculate a second current deviation ΔIo2=Io2*−Io2.

PI control unit 4*a* proportionally integrates first voltage deviation ΔIo1 from subtractor 5*a* to thereby generate a command value REF1 for bringing first current Io1 closer to first current target value Io1*. PI control unit 4*b* proportionally integrates second voltage deviation ΔIo2 from subtractor 5*b* to thereby generate a command value REF2 for bringing second current Io2 closer to second current target value Io2*.

Based on command values REF1 and REF2, phase shift amount control unit 70 generates: gate signals GSap to GSdp for respectively controlling the switching of semiconductor switching elements Sap to Sdp (first full-bridge circuit 11*p*); gate signals GSas to GSds for respectively controlling the switching of semiconductor switching elements Sas to Sds (second full-bridge circuit 11*s*); and gate signals GSat to GSdt for respectively controlling the switching of semiconductor switching elements Sat to Sdt (third full-bridge circuit 11*t*). Command value REF1 corresponds to one example of the "first command value", and command value REF2 corresponds to one example of the "second command value".

First full-bridge circuit 11*p*, second full-bridge circuit 11*s*, and third full-bridge circuit 11*t* can be operated according to any known control scheme. On the other hand, in the present embodiment, by way of example, phase shift amount control unit 70 conducts phase-shift pulse-width-modulation (PWM) control, as described below, for adjusting the phase shift amount among AC voltages Vinvp, Vinvs, and Vinvt generated at AC output ends of first full-bridge circuit 11*p*, second full-bridge circuit 11*s*, and third full-bridge circuit 11*t*, respectively, to thereby control first voltage Vo1 and second voltage Vo2 with the above-mentioned power transmission. Thus, gate signals GSap to GSdp, GSas to GSds, and GSat to GSdt mentioned above are generated according to the switching patterns applied for generating the phase shift amounts calculated from command values REF1 and REF2. Gate signals GSap to GSdp, GSas to GSds, and GSat to GSdt each correspond to one example of the "converter control command".

Hereinafter, θ1, θ2, and θ3 respectively denote the phase shift amounts of AC voltages Vinvp, Vinvs, and Vinvt with respect to the reference phase, in which AC voltages Vinvp, Vinvs, and Vinvt are generated at the AC output ends of first full-bridge circuit 11*p*, second full-bridge circuit 11*s*, and third full-bridge circuit 11*t*, respectively. Phase shift amount control unit 70 calculates phase shift amounts θ1, θ2, and θ3 from command values REF1 and REF2. Phase shift amount control unit 70 controls the switching of the semiconductor switching elements in first full-bridge circuit 11*p*, second full-bridge circuit 11*s*, and third full-bridge circuit 11*t* such that phase shift amounts θ1 to θ3 can be achieved.

Figure 7:
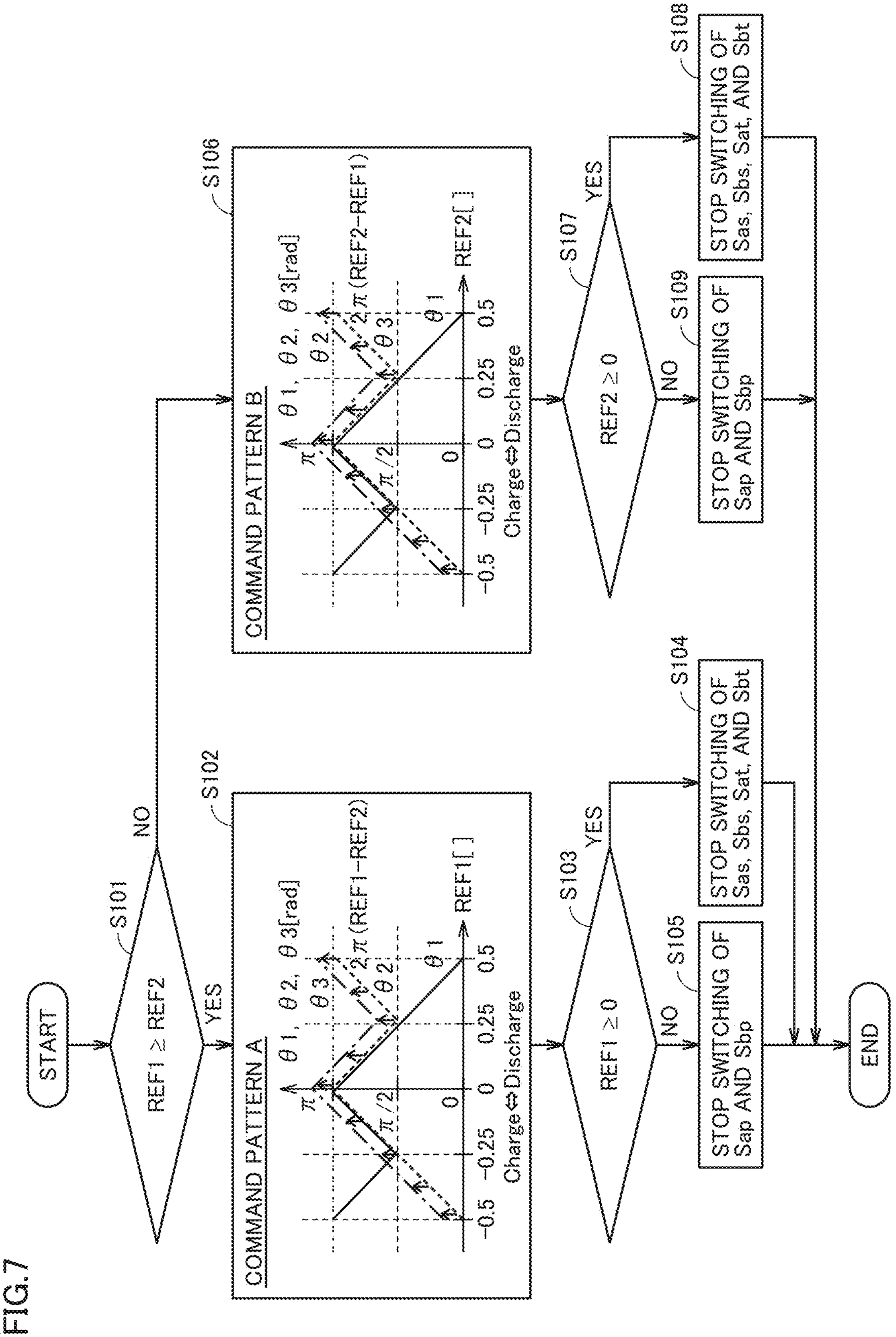
FIG. 7 is a flowchart illustrating a procedure of switching control in power conversion device 1000A according to the second embodiment.

FIG. 7 is a flowchart illustrating a procedure of switching control in power conversion device 1000A according to the second embodiment.

In step S101, when REF1 is equal to or greater than REF2, the process proceeds to step S102. When REF1 is less than REF2, the process proceeds to step S106.

In step S102, phase shift amount control unit 70 sets phase shift amounts θ1, θ2, and θ3 in accordance with the characteristics of the illustrated polygonal line shape based on a command pattern A.

Specifically, phase shift amount control unit 70 determines phase shift amounts θ1, θ2, and θ3 according to the expressions (A1) to (A7) assuming that "a" is a constant.

$$\theta 1 = (-\pi/a) \times REF1 \quad (-a \le REF1 < -a/2) \tag{A1}$$

$$\theta 1 = (\pi/a) \times REF1 + \pi \quad (-a/2 \le REF1 < 0) \tag{A2}$$

$$\theta 1 = (-\pi/a) \times REF1 + \pi \quad (0 \le REF1 \le a) \tag{A3}$$

$$\theta 2 = (\pi/a) \times REF1 + \pi \quad (-a \le REF1 < 0) \tag{A4}$$

$$\theta 2 = (-\pi/a) \times REF1 + \pi \quad (0 \le REF1 < a/2) \tag{A5}$$

$$\theta 2 = (\pi/a) \times REF1 \quad (a/2 \le REF1 \le a) \tag{A6}$$

$$\theta 3 = 2\pi \times (REF1 - REF2) + \theta 2 \quad (-a \le REF1 \le a) \tag{A7}$$

In this case, "a" can be set to be equal to 0.5 (a=0.5) as shown in FIG. 7.

In step S103, when REF1 is equal to or greater than 0, the process proceeds to step S104. When REF1 is less than 0, the process proceeds to step S105.

In step S104, phase shift amount control unit 70 determines that converter 100A performs the discharging operation for first DC power supply 2*p*. Phase shift amount control unit 70 fixes semiconductor switching elements Sas and Sbs constituting first leg LG1*s* of second full-bridge circuit 11*s* to be off, and fixes semiconductor switching elements Sat and Sbt constituting first leg LG1*t* of third full-bridge circuit 11*t* to be off.

In step S105, phase shift amount control unit 70 determines that converter 100A performs the charging operation for first DC power supply 2*p*. Phase shift amount control unit 70 fixes semiconductor switching elements Sap and Sbp constituting first leg LG1*p* of first full-bridge circuit 11*p* to be off.

In step S106, phase shift amount control unit 70 sets phase shift amounts θ1, θ2, and θ3 in accordance with the characteristics of the illustrated polygonal line shape based on a command pattern B.

Specifically, phase shift amount control unit 70 determines phase shift amounts θ1, θ2, and θ3 according to the expressions (B1) to (B7) assuming that "a" is a constant.

$$\theta 1 = (-\pi/a) \times REF2 \quad (-a \le REF2 < -a/2) \tag{B1}$$

$$\theta 1 = (\pi/a) \times REF2 + \pi \quad (-a/2 \le REF2 < 0) \tag{B2}$$

$$\theta 1 = (-\pi/a) \times REF2 + \pi \quad (0 \le REF2 \le a) \tag{B3}$$

$$\theta 3 = (\pi/a) \times REF2 + \pi \quad (-a \le REF2 < 0) \tag{B4}$$

$$\theta 3 = (-\pi/a) \times REF2 + \pi \quad (0 \le REF2 < a/2) \tag{B5}$$

$$\theta 3 = (\pi/a) \times REF2 \quad (a/2 \le REF2 \le a) \tag{B6}$$

$$\theta 2 = 2\pi \times (REF2 - REF1) + \theta 3 \quad (-a \le REF2 \le a) \tag{B7}$$

In this case, "a" can be set to be equal to 0.5 (a=0.5) as shown in FIG. 7.

In step S107, when REF2 is equal to or greater than 0, the process proceeds to step S108. When REF2 is less than 0, the process proceeds to step S109.

In step S108, phase shift amount control unit 70 determines that converter 100A performs the discharging operation for first DC power supply 2*p*. Phase shift amount control unit 70 fixes semiconductor switching elements Sas and Sbs constituting first leg LG1*s* of second full-bridge circuit 11*s* to be off and also fixes semiconductor switching elements Sat and Sbt constituting first leg LG1*t* of third full-bridge circuit 11*t* to be off.

In step S109, phase shift amount control unit 70 determines that converter 100A performs the charging operation for first DC power supply 2*p*. Phase shift amount control unit 70 fixes semiconductor switching elements Sap and Sbp constituting first leg LG1*p* of first full-bridge circuit 11*p* to be off.

Phase shift amount control unit 70 generates GSap to GSdp, GSas to GSds, and GSat to GSdt applied for switching control of the semiconductor switching elements in each of first full-bridge circuit 11*p*, second full-bridge circuit 11*s*, and third full-bridge circuit 11*t* so as to implement phase shift amounts θ1 to θ3 and the switching stopping control that are set as described above.

According to command patterns A and B, a command value is generated based on a condition that an output port 1 (second DC voltage terminal VEs) corresponding to command value REF1 and an output port 2 (third DC voltage terminal VEt) corresponding to command value REF2 are balanced (a voltage and a circuit constant equivalent, REF1=REF2). In command patterns A and B, one of θ2 and θ3 is shifted from the balanced state. For example, in the case of the adjustment only based on θ2, when the configurations and the output conditions of output port 1 (second DC voltage terminal VEs) and output port 2 (third DC voltage terminal VEt) are interchanged, the current and the voltage generated in multi-winding transformer 20A are not symmetrical between output port 1 (second DC voltage terminal VEs) and output port 2 (third DC voltage terminal VEt) before and after the interchange. Such an impaired symmetry deteriorates the control performance for each output port current, and decreases the effect of suppressing reactive power resulting from the occurrence of an unexpected operation mode. As a result, the passive components (a smoothing capacitor, a multi-winding transformer) need to be increased in size.

Figure 8:
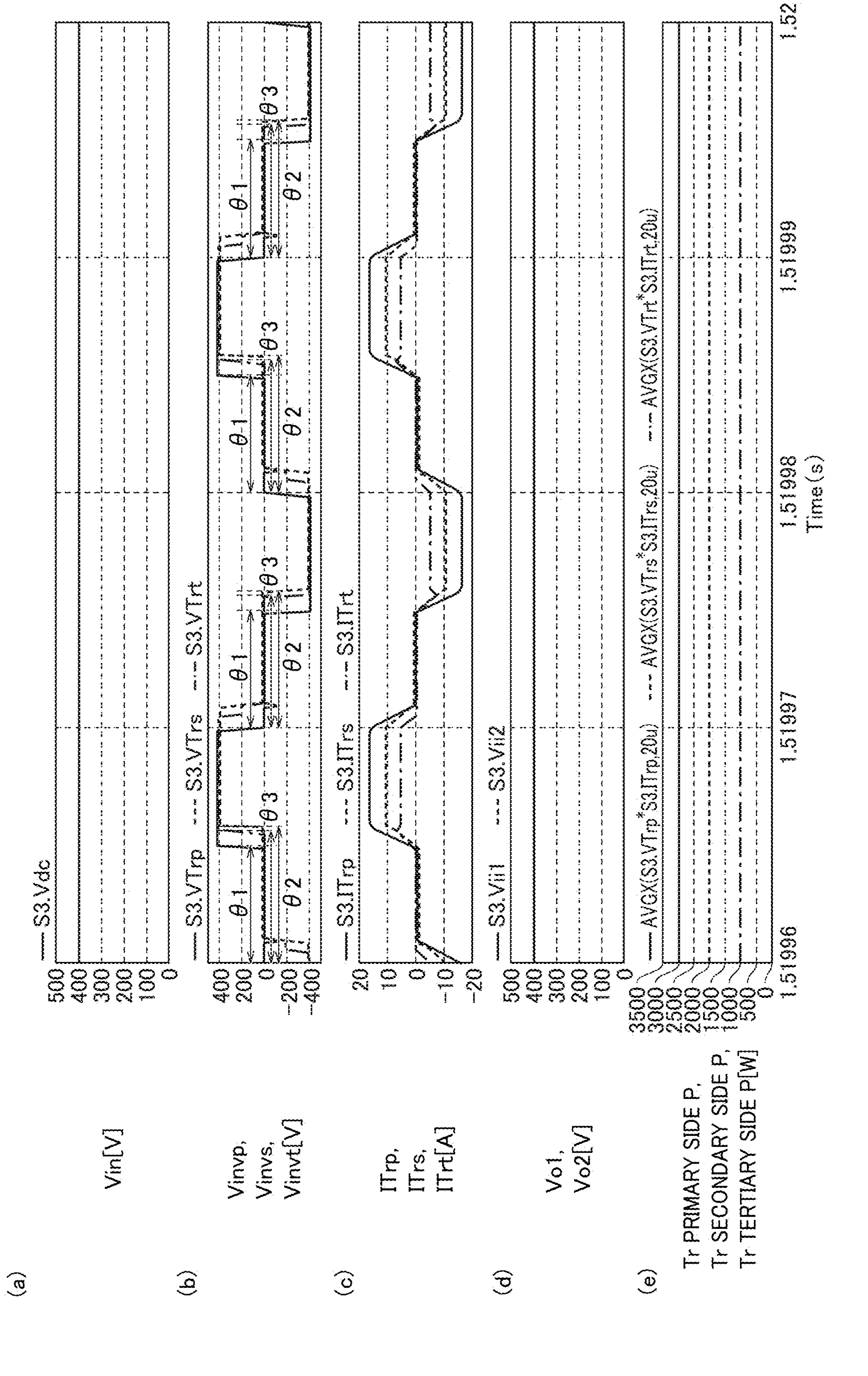
FIG. 8 is a diagram illustrating a waveform example of each component of a converter 100A that occurs when phase shift amounts θ1, θ2, and θ3 are controlled in accordance with command values REF1 and REF2 according to the procedure in FIG. 7.

FIG. 8 is a diagram illustrating a waveform example of each component of converter 100A that occurs when phase shift amounts θ1, θ2, and θ3 are controlled in accordance with command values REF1 and REF2 according to the procedure in FIG. 7.

FIG. 8(*a*) shows Vin, FIG. 8(*b*) shows Vinvp, Vinvs, and Vinvt, FIG. 8(*c*) shows ITrp, ITrs, and ITrt, FIG. 8(*d*) shows Vo1 and Vo2, and FIG. 8(*e*) shows electric power on each of the primary side, the secondary side (second DC power supply 2*s*), and the tertiary side (third DC power supply 2*t*) of multi-winding transformer 20A.

Figures 9, 10, 11:
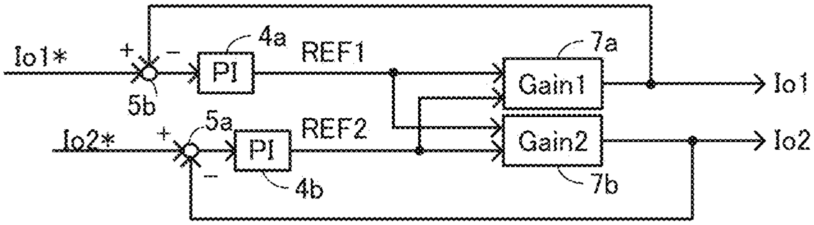
FIG. 9 is a control block diagram 500 of a current control unit 60 according to the first embodiment.
FIG. 10 is a diagram illustrating an example of an operation mode in a command pattern A under representative voltage conditions.
FIG. 11 is a diagram illustrating an example of an operation mode in a command pattern B under representative voltage conditions.

FIG. 9 is a control block diagram 500 of current control unit 60 according to the first embodiment.

Control block diagram 500 represents the relation between command values REF1, REF2 and output currents Io1, Io2 that change according to command values REF1, REF2.

As shown in FIG. 9, a Gain1 generates Io1 from REF1 and REF2. A Gain2 generates Io2 from REF1 and REF2.

In the case where Gain1 and Gain2 have gains corresponding to the zero to secondary terms of REF1 and REF2, output currents Io1 and Io2 are represented by the expression (1).

[Expression 1]

$$Io1 = Ga0 + Ga11 \cdot REF1 + Ga12 \cdot REF1^2 + Ga21 \cdot REF2 + Ga22 \cdot REF2^2 + Gax \cdot REF1 \cdot REF2 \tag{1}$$

-continued $$Io2 = Gb0 + Gb11 \cdot REF1 + Gb12 \cdot REF1^2 + Gb21 \cdot REF2 + Gb22 \cdot REF2^2 + Gbx \cdot REF1 \cdot REF2$$

When the switching control as shown in FIG. 7 is performed, various operation modes occur. The parameters in the control blocks of Gain1 and Gain2 represented in the expression (1) change for each operation mode. In this case, output currents Io1 and Io2 can be represented by different relational expressions for each operation mode with the use of command values REF1 and REF2. These representative modes are defined as follows in accordance with the number of levels of each bridge voltage and the state of input current Iin. In the following description of each operation mode, a representative mode is defined as a mode in which the circulating power causing an increase in loss in multi-winding transformer 20A is not generated.

In the following description, the discharge mode means a mode in which converter 100A performs a discharging operation for first DC power supply 2*p* (an operation to output electric power from first DC power supply 2*p* to first DC voltage terminal VEp), and the charge mode means a mode in which converter 100A performs a charging operation for first DC power supply 2*p* (an operation to output electric power from first DC voltage terminal VEp to first DC power supply 2*p*).

Three levels of the first bridge AC voltage are {±Vin, 0}. Five levels of the first bridge AC voltage are {±Vin, ±Vin/2 (multi-winding transformer voltage), 0}.

Three levels of the second bridge AC voltage are {±Vo1, 0}. Five levels of the second bridge AC voltage are {±Vo1, ±Vin (multi-winding transformer voltage), 0}. Seven levels of the second bridge AC voltage are {±Vo1, ±Vin (multi-winding transformer voltage), ±Vin/2 (multi-winding transformer voltage), 0}. Nine levels of the second bridge AC voltage are {±Vo1, ±Vin (multi-winding transformer voltage), ±Vin/2 (multi-winding transformer voltage), ±(Vin+(Vo1−Vin)/2) (multi-winding transformer voltage), 0}.

Three levels of the third bridge AC voltage are {±Vo2, 0}. Five levels of the third bridge AC voltage are {±Vo2, ±Vin (multi-winding transformer voltage), 0}. Seven levels of the third bridge AC voltage are {±Vo2, ±Vin (multi-winding transformer voltage), ±Vin/2 (multi-winding transformer voltage), 0}. Nine levels of the third bridge AC voltage are {±Vo2, ±Vin (multi-winding transformer voltage), ±Vin/2 (multi-winding transformer voltage), ±(Vin+(Vo2−Vin)/2) (multi-winding transformer voltage), 0}.

(D1) Discharge Mode 1

The three levels of the first bridge AC voltage, the nine levels of the second bridge AC voltage, and the five levels of the third bridge AC voltage are set, or the three levels of the first bridge AC voltage, the five levels of the second bridge AC voltage, and the nine levels of the third bridge AC voltage are set.

(D2) Discharge Mode 2

The three levels of the first bridge AC voltage, the seven levels of the second bridge AC voltage, and the five levels of the third bridge AC voltage are set, or the three levels of the first bridge AC voltage, the five levels of the second bridge AC voltage, and the seven levels of the third bridge AC voltage are set.

(D3) Discharge Mode 3

The three levels of the first bridge AC voltage, the nine levels of the second bridge AC voltage, and the three levels of the third bridge AC voltage are set, or the three levels of the first bridge AC voltage, the three levels of the second bridge AC voltage, and the nine levels of the third bridge AC voltage are set.

(D4) Discharge Mode 4

The three levels of the first bridge AC voltage, the seven levels of the second bridge AC voltage, and the three levels of the third bridge AC voltage are set, or the three levels of the first bridge AC voltage, the three levels of the second bridge AC voltage, and the seven levels of the third bridge AC voltage are set.

(D5) Discharge Mode 5

The three levels of the first bridge AC voltage, the five levels of the second bridge AC voltage, and the three levels of the third bridge AC voltage are set, or the three levels of the first bridge AC voltage, the three levels of the second bridge AC voltage, and the five levels of the third bridge AC voltage are set.

(C1) Charge Mode 1

The five levels of the first bridge AC voltage, the three levels of the second bridge AC voltage, and the three levels of the third bridge AC voltage are set, and the input current is set at zero.

(C2) Charge Mode 2

The five levels of the first bridge AC voltage, the three levels of the second bridge AC voltage, and the three levels of the third bridge AC voltage are set, the input current is set at a value other than zero, and θ1, θ2 and θ3 are set such that θ1≤θ2 or θ1≤θ3.

(C3) Charge Mode 3

The five levels of the first bridge AC voltage, the three levels of the second bridge AC voltage, and the three levels of the third bridge AC voltage are set, the input current is set at a value other than zero, and θ1, θ2 and θ3 are set such that θ1≥θ2 or θ1≥θ3.

(C4) Charge Mode 4

The three levels of the first bridge AC voltage, the three levels of the second bridge AC voltage, and the three levels of the third bridge AC voltage are set, and θ1, θ2, θ3 are set such that θ1≤θ2 or θ1≤θ3.

(C3) Charge Mode 5

The three levels of the first bridge AC voltage, the three levels of the second bridge AC voltage, and the three levels of the third bridge AC voltage are set, and θ1, θ2, θ3 are set such that θ1≥θ2 or θ1≥θ3.

FIG. 10 is a diagram illustrating an example of an operation mode in command pattern A under representative voltage conditions.

In the case where REF1−REF2 is 0, a discharge mode 2 is set when REF1 is equal to or less than a certain value, and a discharge mode 5 is set when REF1 exceeds a certain value.

In the case where REF1−REF2 are positive, a discharge mode 1, a discharge mode 3, or discharge mode 5 is set when REF1 is equal to or less than a certain value, and discharge mode 3 or a discharge mode 4 is set when REF1 exceeds a certain value.

FIG. 11 is a diagram illustrating an example of an operation mode in command pattern B under representative voltage conditions.

In the case where REF1−REF2 are negative, discharge mode 1, discharge mode 3, or discharge mode 4 is set when REF2 is equal to or less than a certain value, and discharge mode 3 or discharge mode 4 is set when REF2 exceeds a certain value.

In the case where REF1−REF2 is 0, discharge mode 2 is set when REF2 is equal to or less than a certain value, and discharge mode 5 is set when REF2 exceeds a certain value.

Note that an undefined operation mode is excluded from operation targets in the present embodiment.

Figure 12:
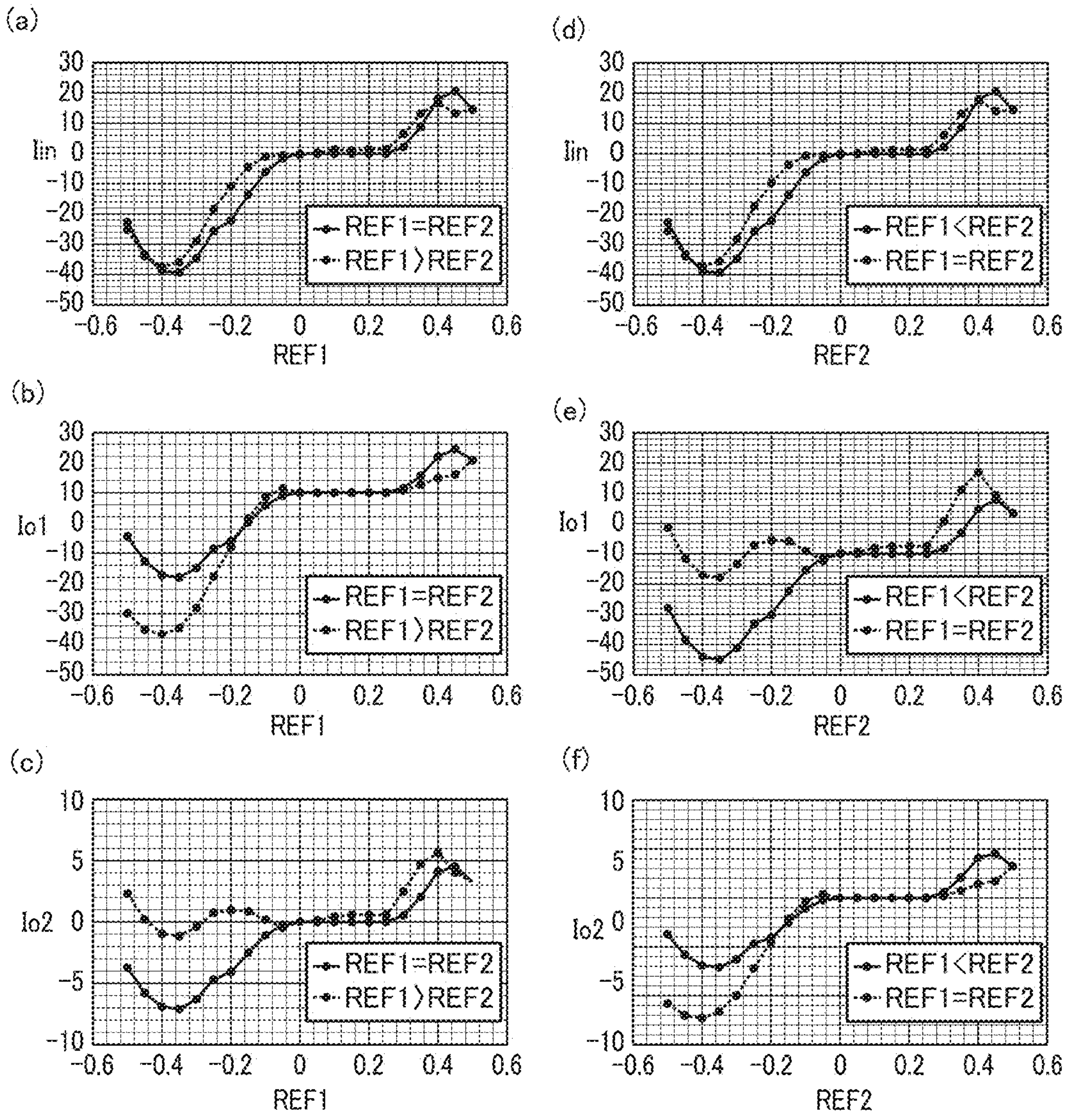
FIG. 12(*a*) is a diagram illustrating an example of an output current Iin with respect to REF1 in command pattern A under representative voltage conditions.

FIG. 12(*a*) is a diagram illustrating an example of output current Iin with respect to REF1 in command pattern A under representative voltage conditions. FIG. 12(*b*) is a diagram illustrating an example of output current Io1 with respect to REF1 in command pattern A under representative voltage conditions. FIG. 12(*c*) is a diagram illustrating an example of output current Io2 with respect to REF1 in command pattern A under representative voltage conditions, FIG. 12(*d*) is a diagram illustrating an example of output current Iin with respect to REF2 in command pattern B under representative voltage conditions. FIG. 12(*e*) is a diagram illustrating an example of output current Io1 with respect to REF2 in command pattern B under representative voltage conditions. FIG. 12(*f*) is a diagram illustrating an example of output current Io2 with respect to REF2 in command pattern B under representative voltage conditions.

As shown in FIGS. 12(*a*) to 12(*f*), the relation of each output current with respect to the corresponding command pattern is nonlinear. Thus, the following shows a state average value (an average value per one period of a carrier) of each output current in a representative operation mode.

In the following description, a command D and a command dD are represented by the following expressions.

$$\text{In the case where } REF1 > REF2,\ D = REF1,\ dD = REF1 - REF2 \quad \text{(R1)}$$

$$\text{In the case where } REF1 < REF2,\ D = REF2,\ dD = REF2 - REF1 \quad \text{(R2)}$$

$$\text{In the case where } REF1 = REF2,\ D = REF1 = REF2,\ dD = 0 \quad \text{(R3)}$$

The average current on the battery side and the average current at the input port each are an average current of Iin. The average current at the output port is an average of the average current of Io1 and the average current of Io2. The output voltages of respective bridges are AC voltages VTrp, VTrs, and VTrt. The phase currents of the transformer are AC currents ITrp, ITrs, and ITrt.

Figure 13:
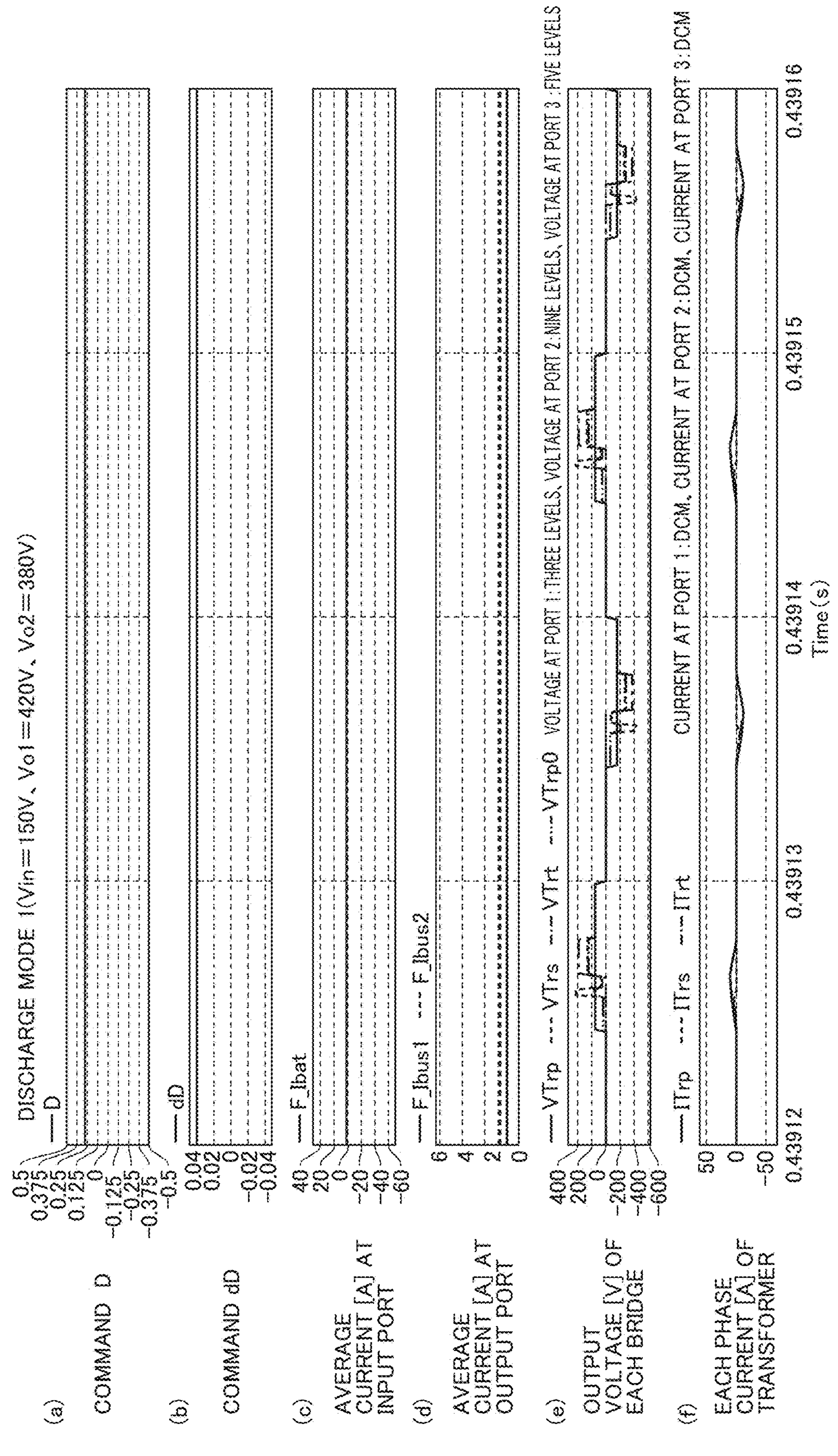
FIG. 13 is a diagram illustrating a waveform example of a discharge mode 1 in command pattern A.

FIG. 13 is a diagram illustrating a waveform example of discharge mode 1 in command pattern A.

In command pattern A of discharge mode 1, output currents Io1 and Io2 can be represented by the expression (2) with phase shift amounts θ1, θ2, and θ3.

[Expression 2]

$$I_{o1} = \frac{\frac{1}{L_2}V_{in}}{1 + \frac{L_1}{L_2} + \frac{L_2}{L_3}} \frac{V_{in}}{V_{o1}\left(1 + \frac{L_1}{L_3}\right) - V_{in}} \frac{T_c}{2\pi^2}(\theta_2 - \theta_1)^2 \quad (2)$$

$$I_{o2} = \frac{1}{L_3}\frac{T_c}{4\pi^2}\frac{V_{in}^2}{V_{o2} - V_{in}}\frac{1}{1 + \frac{L_1}{L_3}}(\theta_3 - \theta_1)^2$$

In command pattern A of discharge mode 1, when REF1 is equal to or greater than 0 and less than 0.25, θ1 takes a value of π(1−2REF1), 02 takes a value of π(1−2REF1), and θ3 takes a value of π(1−2REF2), and thus, the expression (2) is replaced with the expression (2a).

[Expression 3]

$$I_{o1} = 0 \quad (2a)$$

$$I_{o2} = \frac{T_c}{L_3}\frac{V_1^2}{V_{o2} - V_{in}}\frac{(REF1 - REF2)^2}{1 + \frac{L_1}{L_3}}$$

In command pattern A of discharge mode 1, when REF1 is equal to or greater than 0.25, θ1 takes a value of π(1−2REF1), θ2 takes a value of 2πREF1, and θ3 takes a value of 2πREF2, and thus, the expression (2) is replaced with the expression (2b).

[Expression 4]

$$I_{o1} = \frac{\frac{1}{L_2}V_{in}}{1 + \frac{L_1}{L_2} + \frac{L_1}{L_3}} \frac{V_{in}}{V_{o1}\left(1 + \frac{L_1}{L_3}\right) - V_{in}} \frac{T_c}{4}(4REF1 - 1)^2 \quad (2b)$$

$$I_{o2} = \frac{1}{L_3}\frac{T_c}{4}\frac{V_{in}^2}{V_{o2} - V_{in}}\frac{1}{1 + \frac{L_1}{L_3}}(2REF1 - 2REF2 - 1)^2$$

Figure 14:
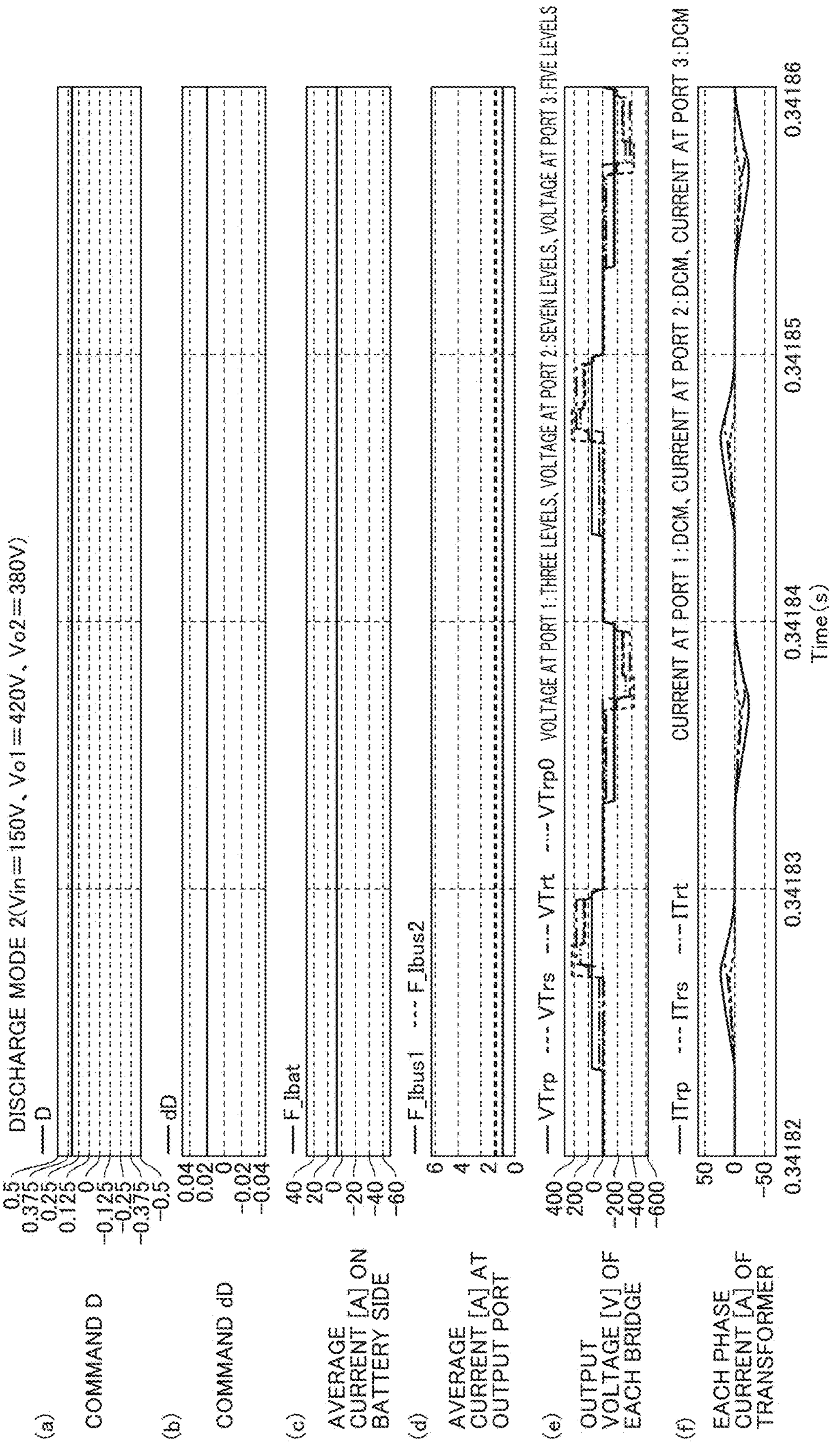
FIG. 14 is a diagram illustrating a waveform example of a discharge mode 2 in command pattern A.

FIG. 14 is a diagram illustrating a waveform example of discharge mode 2 in command pattern A.

In command pattern A of discharge mode 2, output currents Io1 and Io2 can be represented by the expression (3) with phase shift amounts θ1, θ2, and θ3.

[Expression 5]

$$I_{o1} = \frac{T_c}{4\pi^2}\frac{\frac{1}{L_2}}{1 + \frac{L_1}{L_2} + \frac{L_1}{L_3}}\frac{\frac{L_1}{L_3}V_{o2}V_{in}(\theta_1 - \theta_3)^2 - \left(V_{in}^2 + \frac{L_1}{L_3}V_{o2}V_{in}\right)(\theta_1 - \theta_2)^2 - \frac{L_1}{L_3}V_{o2}V_{o1}\left(1 + \frac{L_1}{L_3}\right)(\theta_2 - \theta_3)^2}{V_{in} + \frac{L_1}{L_3}V_{o2} - \left(1 + \frac{L_1}{L_3}\right)V_{o1}} \quad (3)$$

$$I_{o2} = \frac{\frac{1}{L_3}}{1 + \frac{L_1}{L_2} + \frac{L_1}{L_3}}\frac{T_c}{4\pi^2}\left\{V_{in}(\theta_1 - \theta_3) + \frac{L_1}{L_2}V_{o1}(\theta_2 - \theta_3)\right\}\left\{\theta_3 - \frac{V_{in}\theta_1 - \left(1 + \frac{L_1}{L_3}\right)V_{o1}\theta_2 + \frac{L_1}{L_3}V_{o1}\theta_3}{V_{in} - \left(1 + \frac{L_1}{L_3}\right)V_{o1} + \frac{L_1}{L_3}V_{o2}}\right\} +$$

-continued $$\frac{\frac{1}{L_3}}{\mathrm{V}_{in}-\left(1+\frac{L_1}{L_3}\right)\mathrm{V}_{o1}+\frac{L_1}{L_3}\mathrm{V}_{o2}}\frac{T_c}{4\pi^2}\{(\mathrm{V}_{o1}-\mathrm{V}_{o1})\mathrm{V}_{in}\theta_1+(\mathrm{V}_{o2}-\mathrm{V}_{in})\mathrm{V}_{o1}\theta_2+(\mathrm{V}_{in}-\mathrm{V}_{o1})\mathrm{V}_{o2}\theta_3\}\frac{\mathrm{V}_{in}(\theta_1-\theta_3)}{\mathrm{V}_{in}-\mathrm{V}_{o2}}$$

In command pattern A of discharge mode 2, when REF1 is equal to or greater than 0 and less than 0.25, θ1 takes a value π(1−2REF1), θ2 takes a value of π1−2REF1), and θ3 takes a value of π(1−2REF2), and thus, the expression (3) is replaced with the expression (3a).

[Expression 6]

$$I_{o1}=\frac{\frac{1}{L_2}}{1+\frac{L_1}{L_2}+\frac{L_1}{L_3}}\frac{\mathrm{V}_{in}-\mathrm{V}_{o1}\left(1+\frac{L_1}{L_3}\right)}{\mathrm{V}_{in}-\left(1+\frac{L_1}{L_3}\right)\mathrm{V}_{o1}+\frac{L_1}{L_3}\mathrm{V}_{o2}}\frac{L_1}{L_3}\mathrm{V}_{b2}T_cREF1^2 \tag{3a}$$

$$I_{o2}=\left[\frac{\frac{1}{L_3}}{1+\frac{L_1}{L_2}+\frac{L_1}{L_3}}\left\{\mathrm{V}_{in}+\frac{L_1}{L_2}\mathrm{V}_{o1}\right\}\frac{\{\left(1+\frac{L_1}{L_3}\right)\mathrm{V}_{o1}-\mathrm{V}_{in}\}T_c}{\mathrm{V}_{in}-\left(1+\frac{L_1}{L_3}\right)\mathrm{V}_{o1}+\frac{L_1}{L_3}\mathrm{V}_{o2}}-\frac{\frac{1}{L_3}}{\mathrm{V}_{in}-\left(1+\frac{L_1}{L_3}\right)\mathrm{V}_{o1}+\frac{L_1}{L_3}\mathrm{V}_{o2}}(\mathrm{V}_{in}-\mathrm{V}_{o1})\frac{\mathrm{V}_{in}\mathrm{V}_{o2}T_c}{\mathrm{V}_{in}-\mathrm{V}_{o2}}\right](REF1-REF2)^2$$

In command pattern A of discharge mode 2, when REF1 is equal to or greater than 0.25, θ1 takes a value of π(1−2REF1), θ2 takes a value of 2πREF1, and θ3 takes a value of 2πREF2, and thus, the expression (3) is replaced with the expression (3b).

[Expression 7]

$$I_{o1}=\frac{T_c}{4}\frac{\frac{1}{L_2}}{1+\frac{L_1}{L_2}+\frac{L_1}{L_3}}\frac{4\frac{L_1}{L_3}\mathrm{V}_{o2}\left\{\mathrm{V}_{in}-\mathrm{V}_{o1}\left(1+\frac{L_1}{L_3}\right)\right\}(REF1-REF2)^2-\mathrm{V}_{in}^2(1-4REF1)^2-4\frac{L_1}{L_3}\mathrm{V}_{o2}\mathrm{V}_{in}(1-4REF1)(REF1-REF2)}{\mathrm{V}_{in}-\left(1+\frac{L_1}{L_3}\right)\mathrm{V}_{o1}+\frac{L_1}{L_3}\mathrm{V}_{o2}} \tag{3b}$$

$$I_{o2}=\frac{T_c}{4}\frac{\frac{1}{L_3}}{1+\frac{L_1}{L_2}+\frac{L_1}{L_3}}\left\{\frac{4\frac{L_1}{L_2}\mathrm{V}_{in}\mathrm{V}_{o1}(1-6REF1+2REF2)(REF1-REF2)+4\left(1+\frac{L_1}{L_3}\right)\frac{L_1}{L_2}\mathrm{V}_{o1}^2(REF1-REF2)^2-\mathrm{V}_{in}^2(1-6REF1+2REF2)^2}{\mathrm{V}_{in}-\left(1+\frac{L_1}{L_3}\right)\mathrm{V}_{o1}+\frac{L_1}{L_3}\mathrm{V}_{o2}}\right\}+\frac{\frac{1}{L_3}}{\mathrm{V}_{in}-\left(1+\frac{L_1}{L_3}\right)\mathrm{V}_{o1}+\frac{L_1}{L_3}\mathrm{V}_{o2}}\frac{T_c}{4}\frac{(\mathrm{V}_{o1}-\mathrm{V}_{o2})\mathrm{V}_{in}^2(1-6REF1+2REF2)^2}{\mathrm{V}_{in}-\mathrm{V}_{o2}}$$

Figure 15:
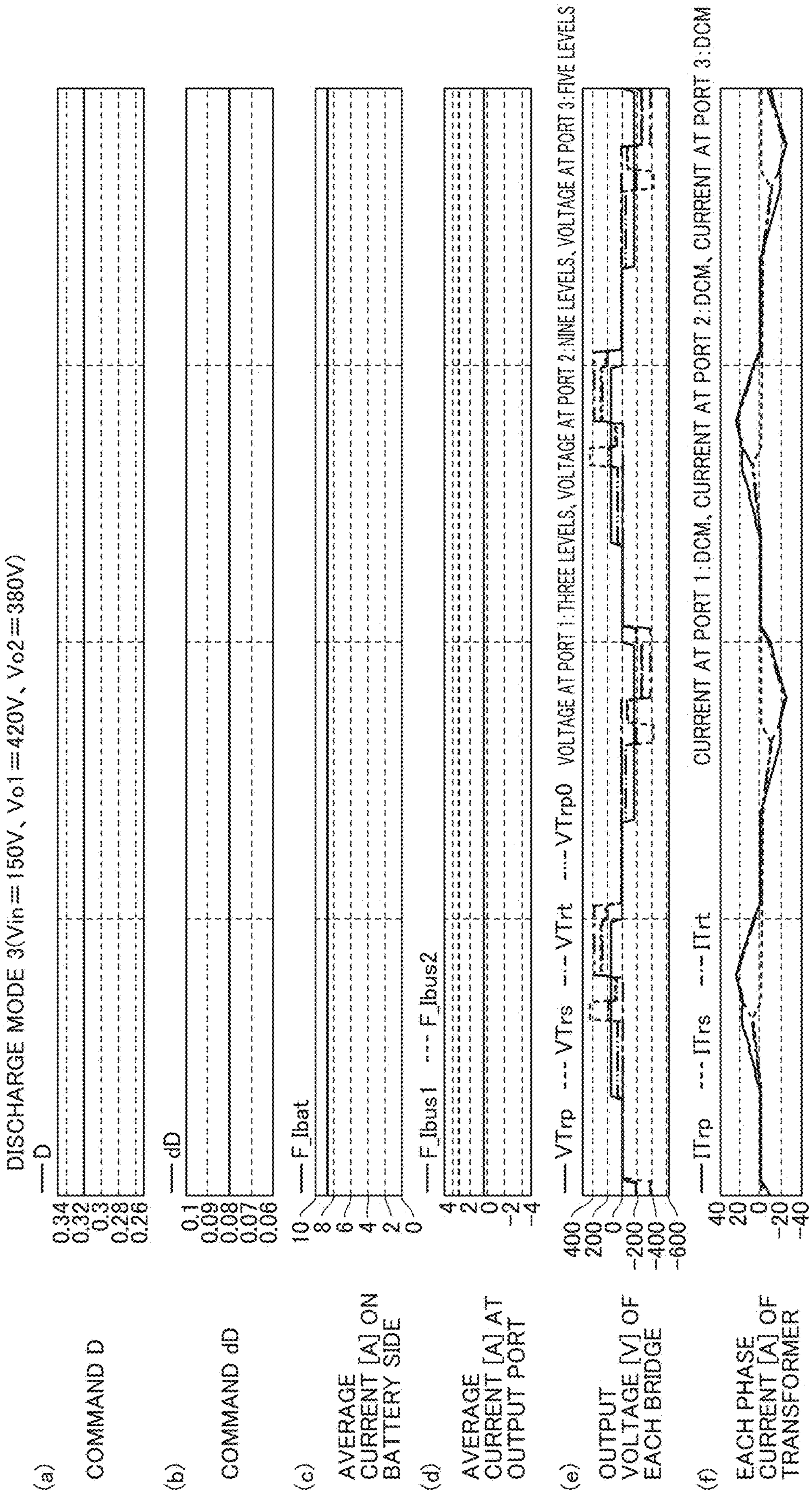
FIG. 15 is a diagram illustrating a waveform example of a discharge mode 3 in command pattern A.

FIG. 15 is a diagram illustrating a waveform example of discharge mode 3 in command pattern A.

In command pattern A of discharge mode 3, output currents Io1 and Io2 can be represented by the expression (4) with phase shift amounts θ1, θ2, and θ3.

[Expression 8]

$$I_{o1}=\frac{\frac{1}{L_2}}{1+\frac{L_1}{L_2}+\frac{L_1}{L_3}}\frac{\mathrm{V}_{in}^2}{\left(1+\frac{L_1}{L_3}\right)\mathrm{V}_{o1}-\mathrm{V}_{in}}\frac{T_c}{4\pi^2}(\theta_2-\theta_1)^2 \tag{4}$$

$$I_{o2}=\frac{1}{L_3}\frac{T_c}{4\pi^2}\frac{\mathrm{V}_{in}}{1+\frac{L_1}{L_3}}\left[(\theta_3-\theta_1)(\pi-\theta_3)+\left\{(\theta_3-\theta_1)+\frac{\mathrm{V}_{in}-\mathrm{V}_{o2}}{\mathrm{V}_{in}}(\pi-\theta_3)\right\}\frac{\mathrm{V}_{in}}{\mathrm{V}_{o2}}(\pi-\theta_1)\right]$$

In command pattern A of discharge mode 3, when REF1 is equal to or greater than 0 and less than 0.25, θ1 takes a value of π(1−2REF1), θ2 takes a value of π(1−2REF1), and θ3 takes a value of π(1−2REF2), and thus, the expression (4) is replaced with the expression (4a).

[Expression 9]

$$I_{o1}=0 \tag{4a}$$

$$I_{o2}=\frac{T_c}{L_3}\frac{\mathrm{V}_{in}}{1+\frac{L_1}{L_3}}\left[(REF2-REF1)REF2+\left\{(REF2-REF1)+\frac{\mathrm{V}_{in}-\mathrm{V}_{o2}}{\mathrm{V}_{in}}REF2\right\}\frac{\mathrm{V}_{in}}{\mathrm{V}_{o2}}REF1\right]$$

In command pattern A of discharge mode 3, when REF1 is equal to or greater than 0.25, θ1 takes a value of π(1−2REF1), θ2 takes a value of 2πREF1, and θ3 takes a value of 2πREF2, and thus, the expression (4) is replaced with the expression (4b).

[Expression 10]

$$I_{o1} = \frac{\frac{1}{L_2}}{1 + \frac{L_1}{L_2} + \frac{L_1}{L_3}} \frac{V_{in}^2}{\left(1 + \frac{L_1}{L_3}\right)V_{o1} - V_{in}} \frac{T_c}{4}(4REF1 - 1)^2 \tag{4b}$$

$$I_{o2} = \frac{1}{L_3}\frac{T_c}{4}\frac{V_{in}}{1 + \frac{L_1}{L_3}}\left[\begin{array}{c}(2REF2 + 2REF1 - 1)(1 - 2REF2) + \\ \{(2REF2 + 2REF1 - 1) + \\ \frac{V_{in} - V_{o2}}{V_{in}}(1 - 2REF2)\}\frac{V_{in}}{V_{o2}}2REF1\end{array}\right]$$

Figure 16:
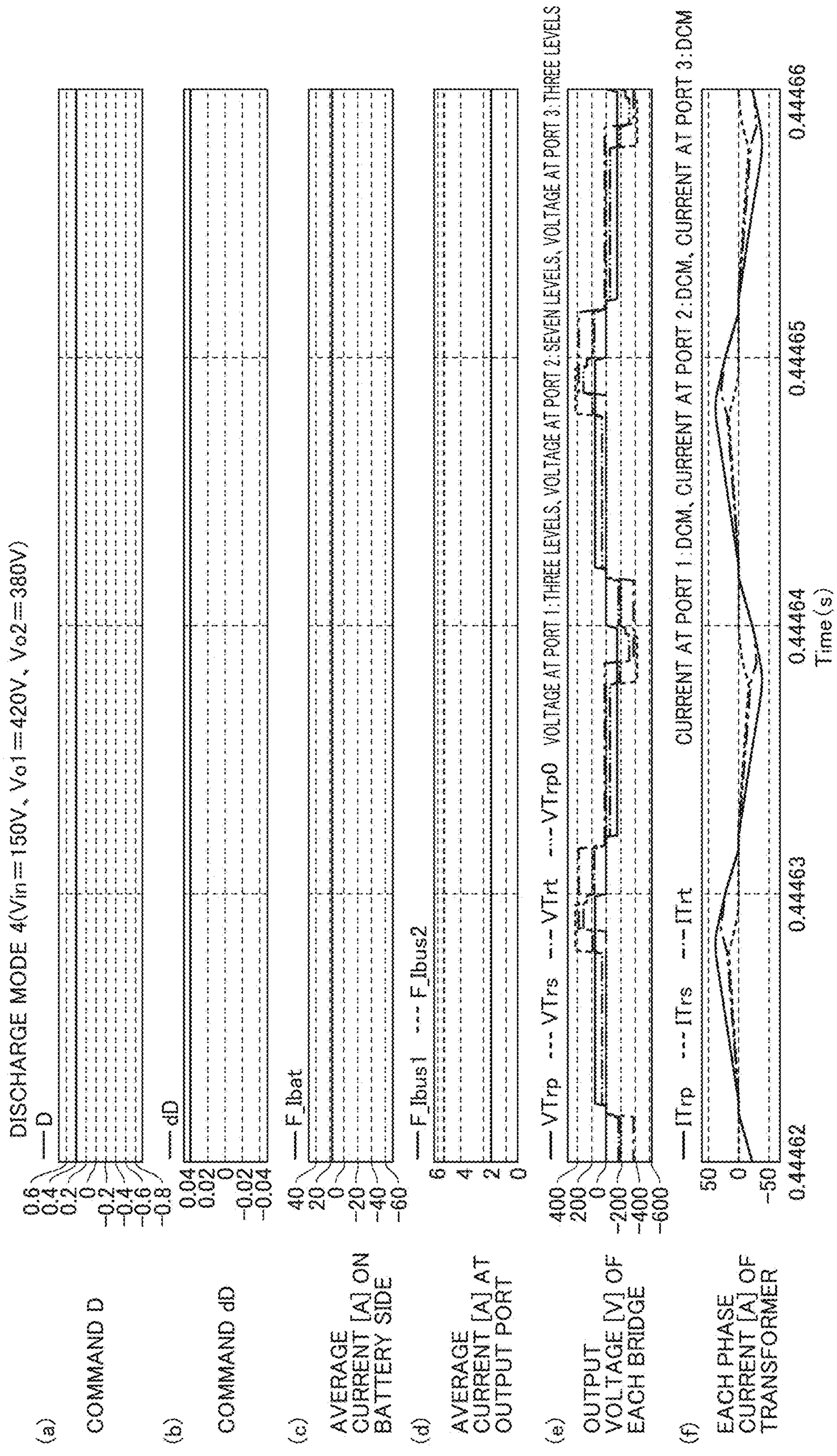
FIG. 16 is a diagram illustrating a waveform example of a discharge mode 4 in command pattern A.
Figure 18:
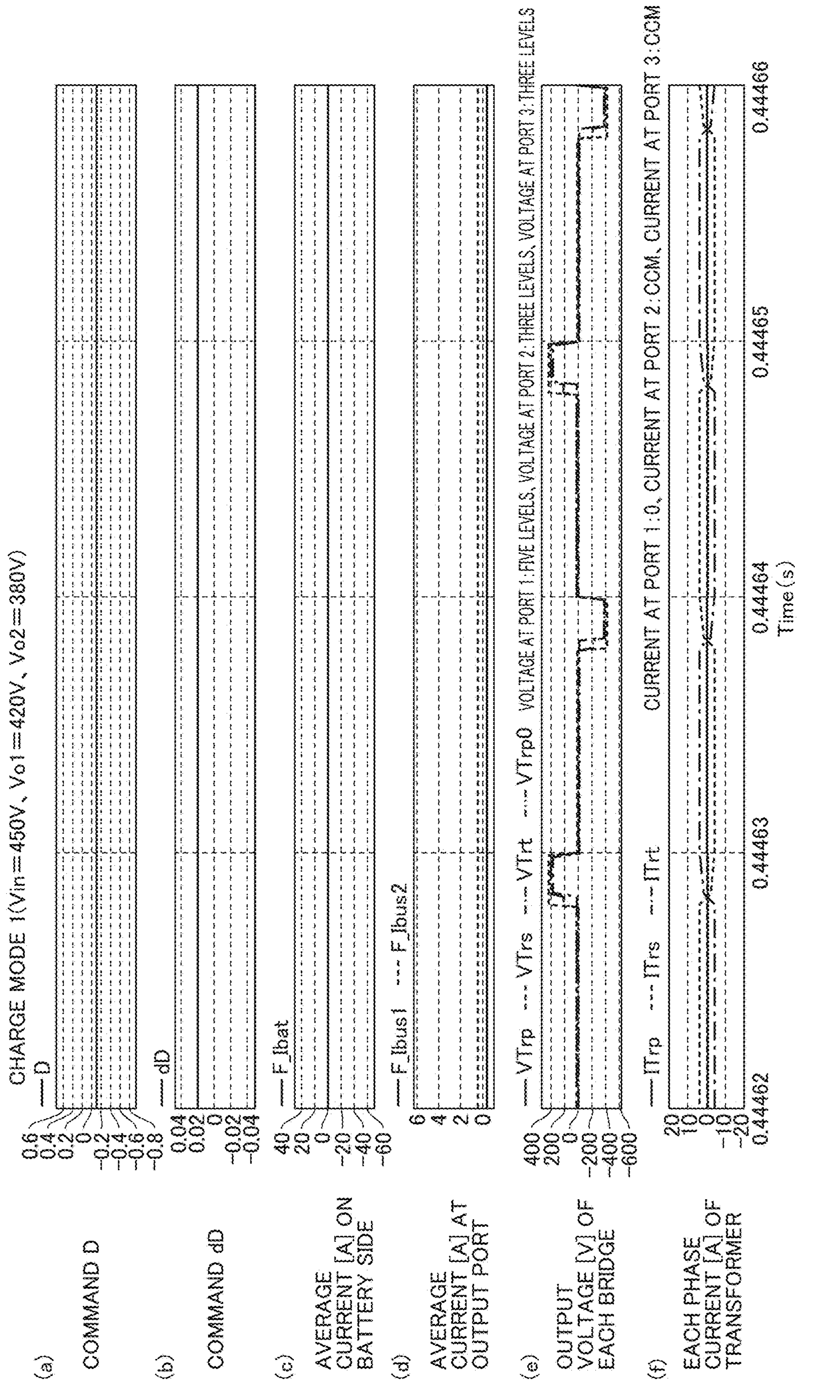
FIG. 18 is a diagram illustrating a waveform example of a charge mode 1 in command pattern A.
Figure 19:
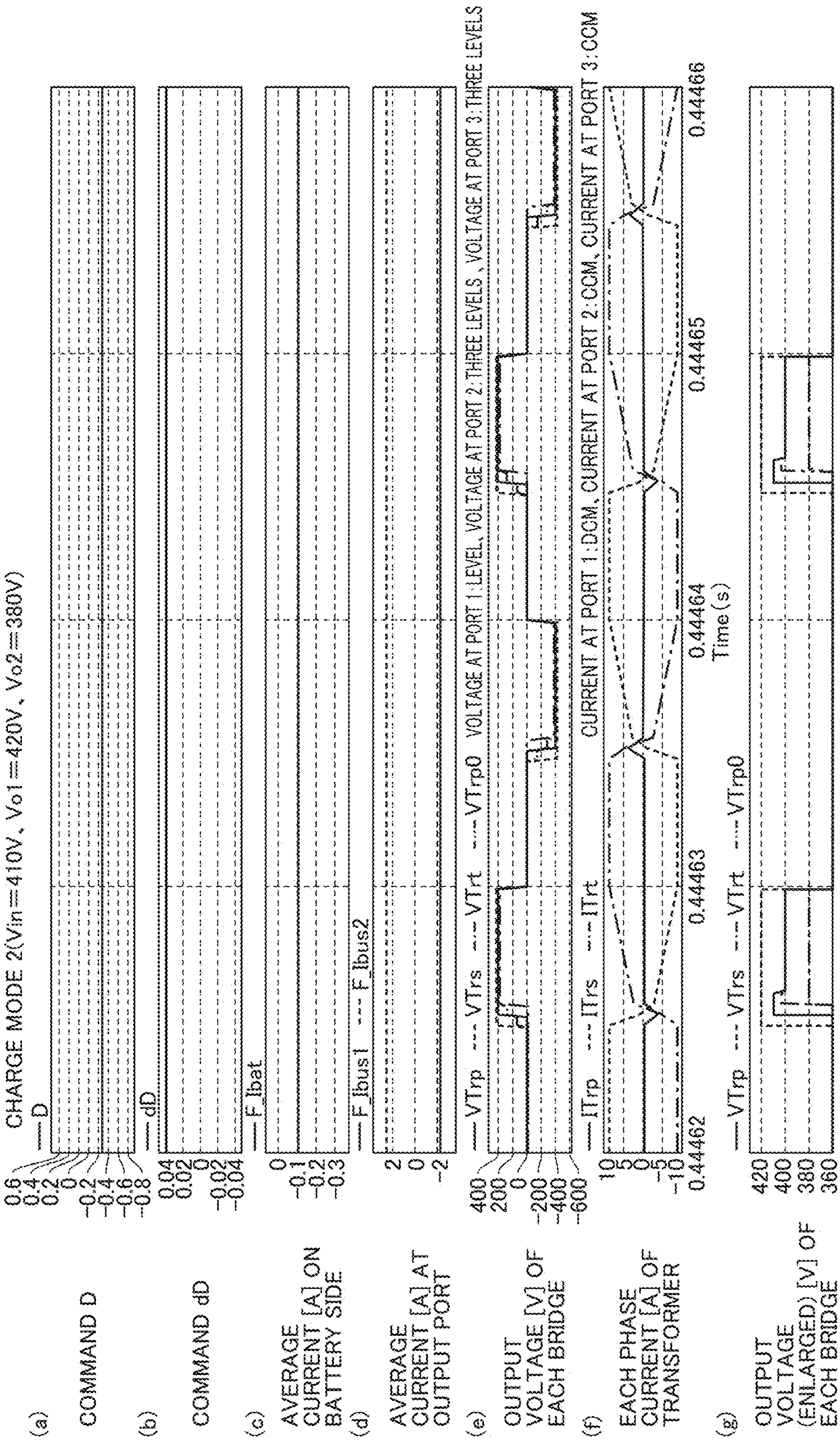
FIG. 19 is a diagram illustrating a waveform example of a charge mode 2 in command pattern A.
Figure 20:
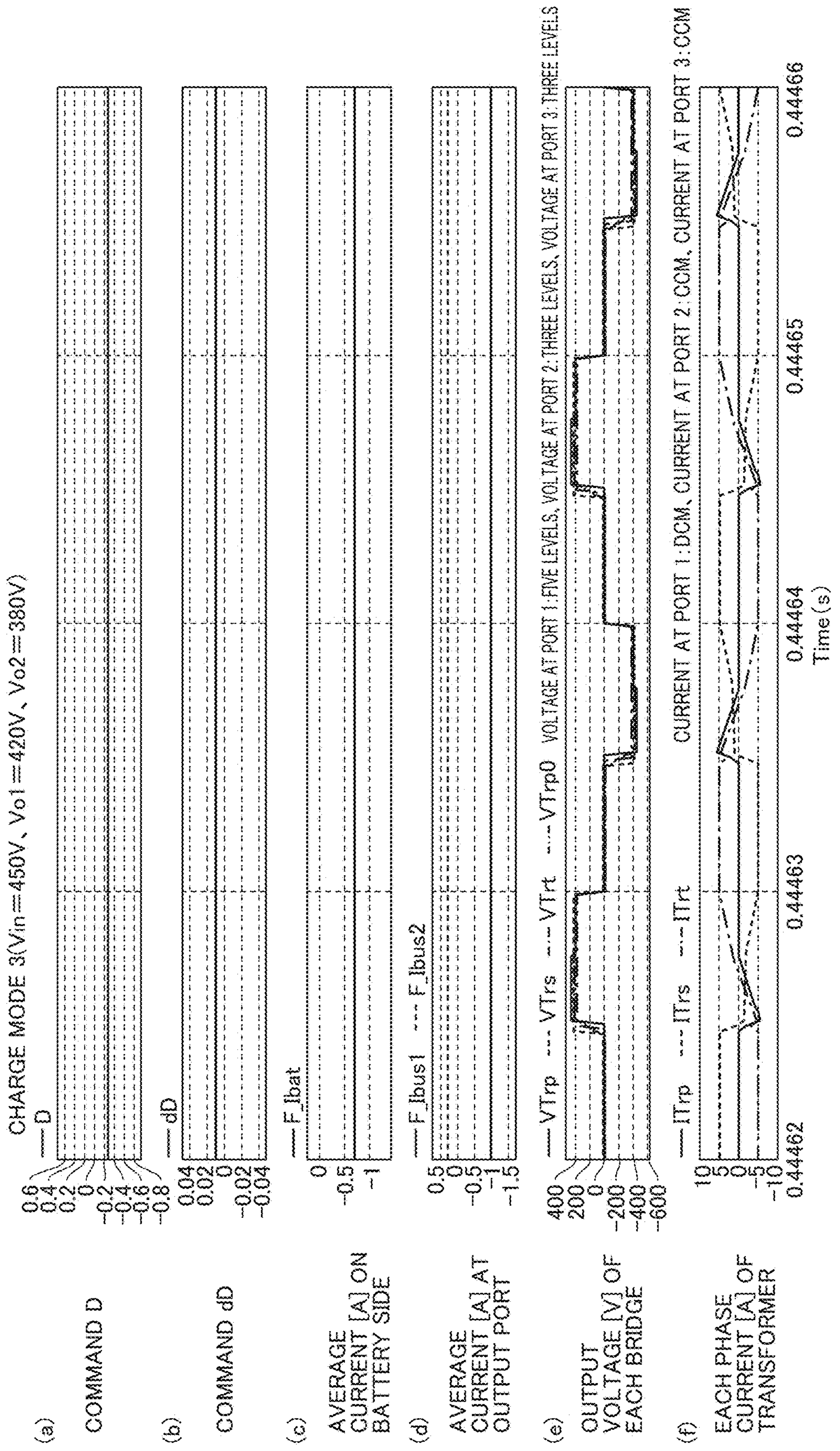
FIG. 20 is a diagram illustrating a waveform example of a charge mode 3 in command pattern A.
Figure 21:
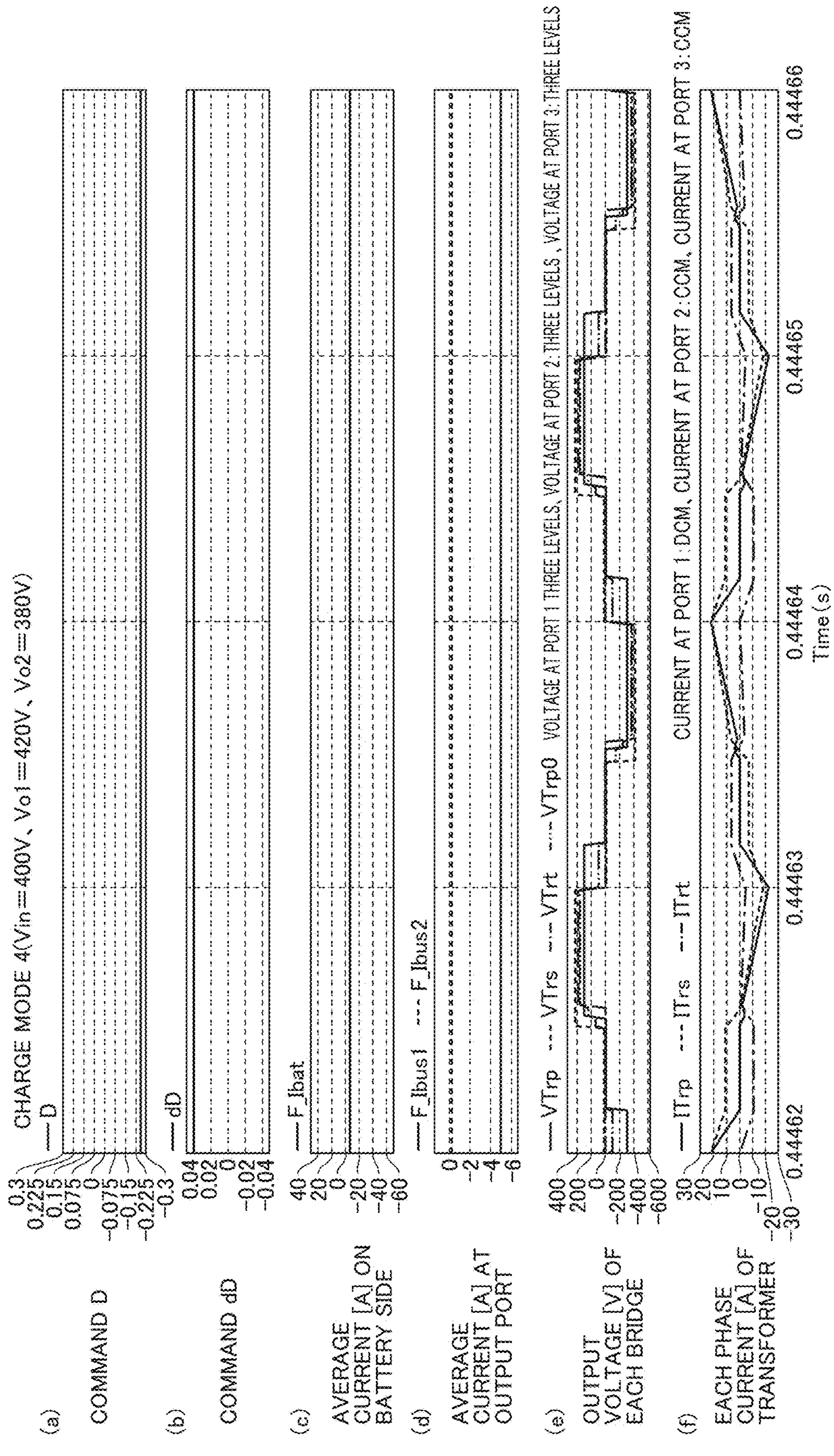
FIG. 21 is a diagram illustrating a waveform example of a charge mode 4 in command pattern A.
Figure 22:
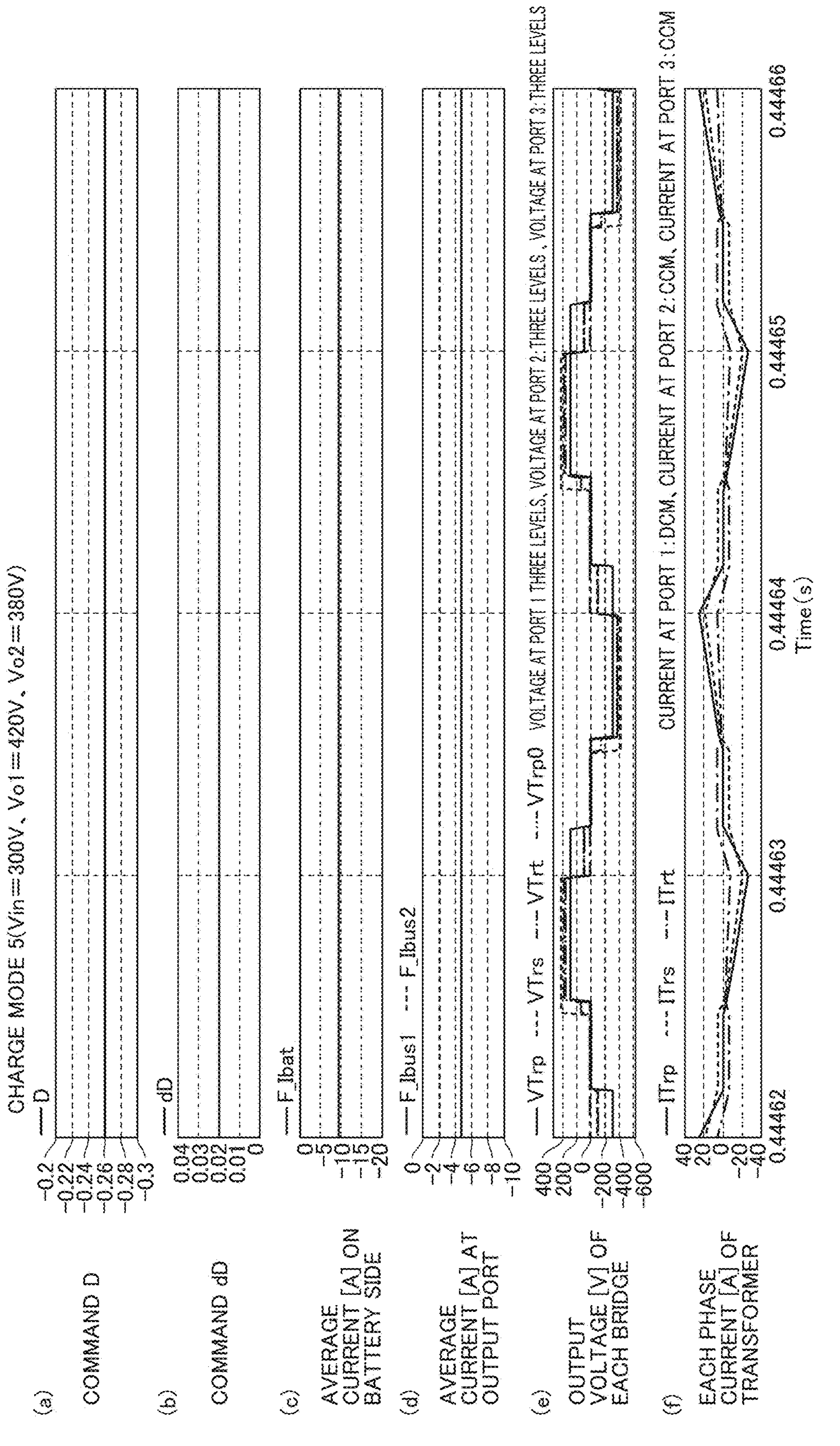
FIG. 22 is a diagram illustrating a waveform example of a charge mode 5 in command pattern A.

FIG. 16 is a diagram illustrating a waveform example of discharge mode 4 in command pattern A. FIG. 17 is a diagram illustrating a waveform example of discharge mode 5 in command pattern A. FIG. 18 is a diagram illustrating a waveform example of a charge mode 1 in command pattern A. FIG. 19 is a diagram illustrating a waveform example of a charge mode 2 in command pattern A. FIG. 20 is a diagram illustrating a waveform example of a charge mode 3 in command pattern A. FIG. 21 is a diagram illustrating a waveform example of a charge mode 4 in command pattern A. FIG. 22 is a diagram illustrating a waveform example of a charge mode 5 in command pattern A.

Also in discharge mode 4, discharge mode 5, charge mode 1, charge mode 2, charge mode 3, charge mode 4, and charge mode 5, expressions equivalent to the expressions (2) to (4), (2a) to (4a), and (2b) to (4b) can be similarly obtained.

The characteristics of command pattern B are the same as those of command pattern A in which θ2 and θ3 are replaced. Thus, the description thereof will not be repeated.

Command patterns A and B described above are merely by way of example. Also in the first embodiment, the phase shift amount can be generated similarly based on the command pattern with respect to the balanced state.

Third Embodiment

As described in the second embodiment, the power conversion device includes various operation modes. In this case, as to a condition under which two expressions among the above-described plurality of expressions coincide with each other in terms of Io1 and Io2 such that Io1 and Io2 in one expression are respectively equal to Io1 and Io2 in the other expression, such a condition is recognized as a boundary between modes of these two expressions.

For example, the boundary between discharge modes 1 and 2 in the case of REF1 equal to or greater than 0.25 in command pattern A is obtained as in the expression (12) based on the expressions (2b) and (3b). In this case, for simplifying the expressions, the difference between command values REF1 and REF2 is denoted as dR.

When REF1 is equal to or less than the value represented by the expression (12), the mode can be determined as discharge mode 1. When REF1 exceeds the value represented by the expression (12), the mode can be determined as discharge mode 2.

Similarly, a boundary between any two of the five discharge modes can be defined. Then, on a plane having an X-axis defined as dR and a Y-axis defined as REF1, the region of each discharge mode is divided by the boundary. Thus, based on which region on the X-Y plane the X(dR) and the Y(REF1) belong to, the discharge mode in which converter 100A is currently operating can be determined from among the five discharge modes.

Similarly, based on which region on the X-Y plane the X(dR) and Y(REF2) belong to, the charge mode in which converter 100A is currently operating can be determined from among the five charge modes.

[Expression 11]

$$REF1 = \frac{1}{4} - \frac{1}{2V_{in}}\left\{V_{o1}\left(1 + \frac{L_1}{L_3}\right) - V_{in}\right\}dR \tag{12}$$

In this way, the boundary between the operation modes can be obtained by obtaining the condition under which Io1 and Io2 in the adjacent operation modes are respectively equal to each other. In accordance with the relation of magnitude between input voltage Vin and output voltages Vo1, Vo2, an operation mode that does not occur and an additional operation mode may occur as compared with the operation mode described in the second embodiment, but the boundary between the operation modes can still be derived by obtaining a condition under which the adjacent operation modes are the same.

By analyzing the boundary between the operation modes in advance as described above, the operation mode can be detected by command values REF1 and REF2. However, since the coefficient applied to the expression (1) is different for each operation mode, the problem about the nonlinearity of control still remains.

Thus, the characteristics with respect to the amount of a minute change are extracted by replacing the expression (1) as in the expression (13).

[Expression 12]

$$\begin{aligned} Io1 + \Delta I1 = {} & Ga0 + Ga11\cdot(REF1 + \Delta REF1) + Ga12\cdot(REF1 + \Delta REF1)^2 + \\ & Ga21\cdot(REF2 + \Delta REF2) + Ga22\cdot(REF2 + \Delta REF2)^2 + Gax\cdot(REF1 + \Delta REF1)\cdot REF2 \end{aligned} \tag{13}$$

$$\begin{aligned} Io2 + \Delta I2 = {} & Gb0 + Gb11\cdot(REF1 + \Delta REF1) + Gb12\cdot(REF1 + \Delta REF1)^2 + \\ & Gb21\cdot(REF2 + \Delta REF2) + Gb22\cdot(REF2 + \Delta REF2)^2 + Gbx\cdot(REF1 + \Delta REF1)\cdot REF2 \end{aligned}$$

The expression (14) is obtained by subtracting the expression (1) from the expression (13).

[Expression 13]

$$\begin{aligned} \Delta I1 = {} & (Ga11 + Gax\cdot REF2 + 2Ga12\cdot REF1)\cdot\Delta REF1 + \\ & (Ga21 + Gax\cdot REF1\cdot + 2Ga22\cdot REF2)\cdot\Delta REF2 + \\ & Ga12\cdot\Delta REF1^2 + Ga22\cdot\Delta REF2^2 + Gax\cdot\Delta REF1\cdot\Delta REF2 \end{aligned} \tag{14}$$

$$\begin{aligned} \Delta I2 = {} & (Gb11 + Gbx\cdot REF2 + 2Gb12\cdot REF1)\cdot\Delta REF1 + \\ & (Gb21 + Gbx\cdot REF1 + 2Gb22\cdot REF2)\cdot\Delta REF2 + \\ & Gb12\cdot\Delta REF1^2 + Gb22\cdot\Delta REF2^2 + Gbx\cdot\Delta REF1\cdot\Delta REF2 \end{aligned}$$

The square term of ΔREF1, the square term of ΔREF2, and the product of ΔREF1 and ΔREF2 in the expression (14) show extremely small values with respect to ΔREF1 and ΔREF2 since each of ΔREF1 and ΔREF2 is set within a range of ±0.5. Therefore, the expression (14) can be approximated by the expression (15).

[Expression 14]

$$\Delta I1 \approx (Ga11 + Gax \cdot REF2 + 2Ga12 \cdot REF1) \cdot \Delta REF1 + (Ga21 + Gax \cdot REF1 + 2Ga22 \cdot REF2) \cdot \Delta REF2 = GA1 \cdot \Delta REF1 + GA2 \cdot \Delta REF2 \tag{15}$$

$$\Delta I2 \approx (Gb11 + Gbx \cdot REF2 + 2Gab12 \cdot REF1) \cdot \Delta REF1 + (Gb21 + Gbx \cdot REF1 + 2Gb22 \cdot REF2) \cdot \Delta REF2 = GB1 \cdot \Delta REF1 + GB2 \cdot \Delta REF2$$

Figure 23:
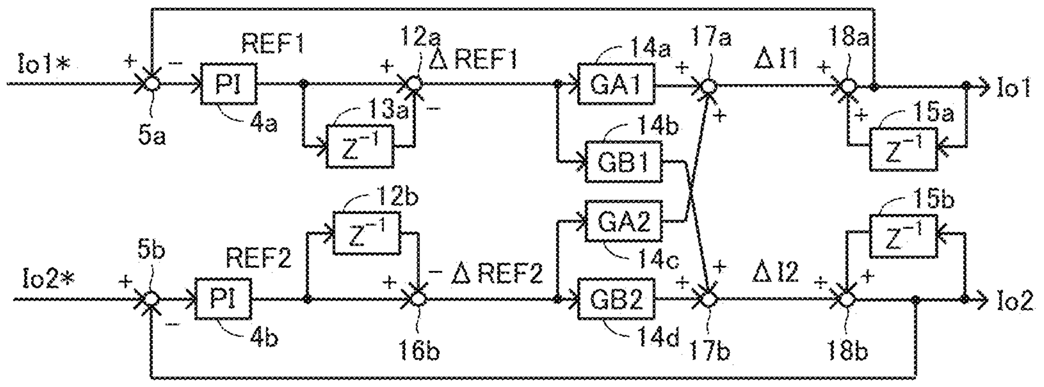
FIG. 23 is a diagram in which a control block diagram is converted into a discrete system, the control block diagram illustrating a relation between command values REF1, REF2 and output currents Io1, Io2 that change in accordance with command values REF1, REF2.

FIG. 23 is a diagram in which a control block diagram is converted into a discrete system, the control block diagram illustrating the relation between command values REF1, REF2 and output currents Io1, Io2 that change in accordance with command values REF1, REF2. In FIG. 23, the control block of the continuous system shown in FIG. 9 is converted into a discrete system based on the expression (15).

GA1 is a gain of ΔREF1 with respect to ΔI1. GA2 is a gain of ΔREF2 with respect to ΔI1. GB1 is a gain of ΔREF1 with respect to ΔI2. GB2 is a gain of ΔREF2 with respect to ΔI2.

The value of gain GA1 (14*a*) can be calculated by Ga11, Gax, Ga12, REF1, and REF2. The value of gain GA2 (14*c*) can be calculated by Ga21, Gax, Ga22, REF1, and REF2. The value of gain GB1 (14*b*) can be calculated by Gb11, Gbx, Gb12, REF1, and REF2. The value of gain GB2 (14*d*) can be calculated by Gb21, Gbx, Gb22, REF1, and REF2.

The values of Ga11, Gax, Ga12, Ga21, Gax, Ga22, Gb11, Gbx, Gb12, Gb21, Gbx, and Gb22 vary depending on the operation mode. These values can be set by comparing the expression (1) with the expressions (2a) to (4a), (2b) to (4b), or the like.

For example, in discharge mode 1, when REF1 is equal to or greater than 0 and less than 0.25, these values can be set by comparison between the expressions (1) and (2a).

A delay unit 13*a* and a subtractor 12*a* generate ΔREF1 from REF1. An adder 17*a* adds the result of multiplication of ΔREF1 and gain GA1 (14*a*) and the result of multiplication of ΔREF2 and gain GA2 (14*c*) to thereby generate ΔI1. An adder 18*a* and a delay unit 15*a* generate Io1 from ΔI1.

A delay unit 13*b* and a subtractor 12*b* generate ΔREF2 from REF2. An adder 17*b* adds the result of multiplication of ΔREF1 and gain GB1 (14*b*) and the result of multiplication of ΔREF2 and gain GB2 (14*d*) to thereby generate ΔI2. An adder 18*b* and a delay unit 15*b* generate Io2 from ΔI2.

As shown in the expression (15) and FIG. 23, ΔI1 and ΔI2 are functions of ΔREF1 and ΔREF2, respectively.

Figure 24:
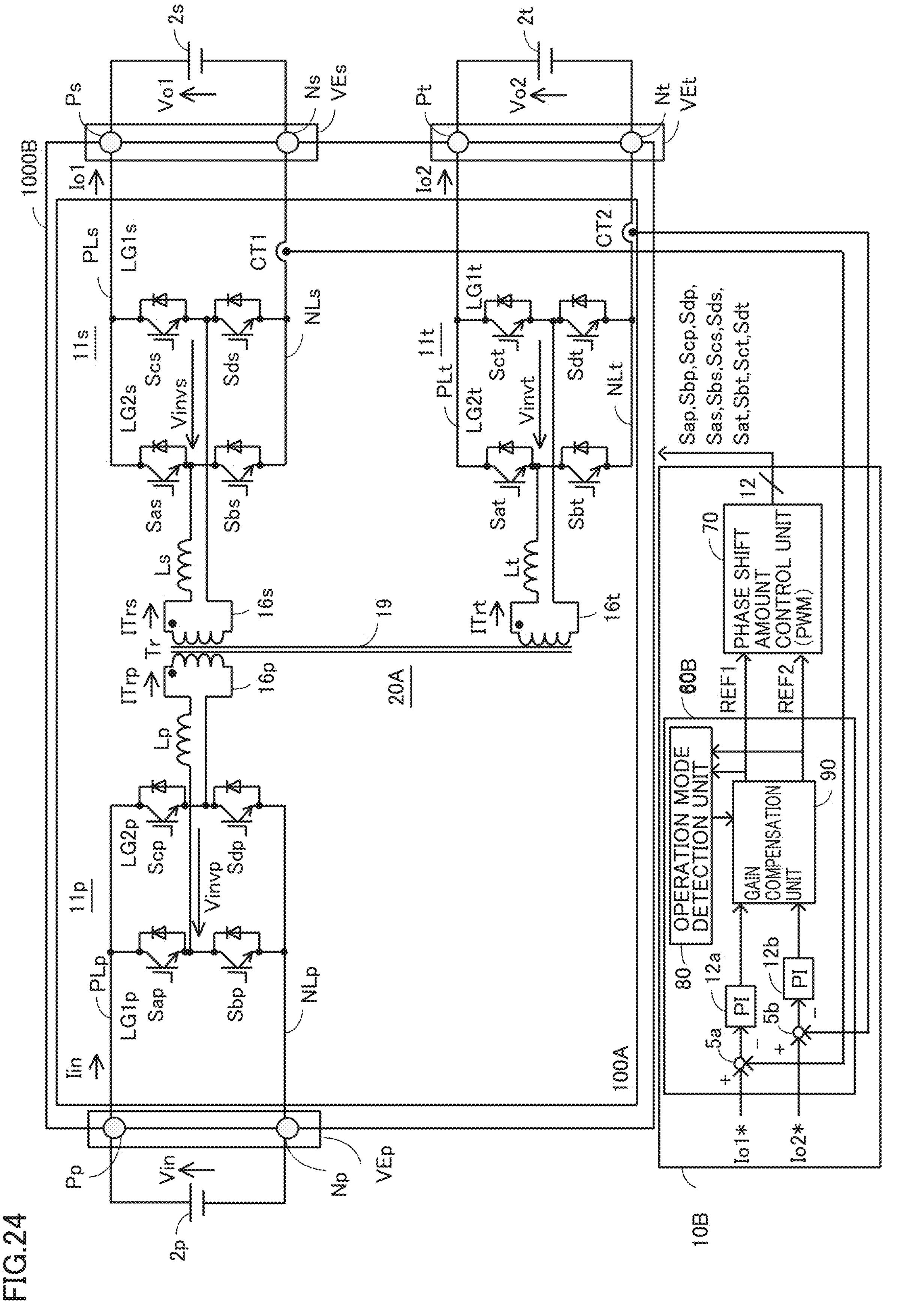
FIG. 24 is a schematic circuit diagram of a power conversion device 1000B according to a third embodiment.

FIG. 24 is a schematic circuit diagram of a power conversion device 1000B according to the third embodiment.

A switching control unit 10B of power conversion device 1000B according to the third embodiment includes a current control unit 60B and phase shift amount control unit 70.

Figure 25:
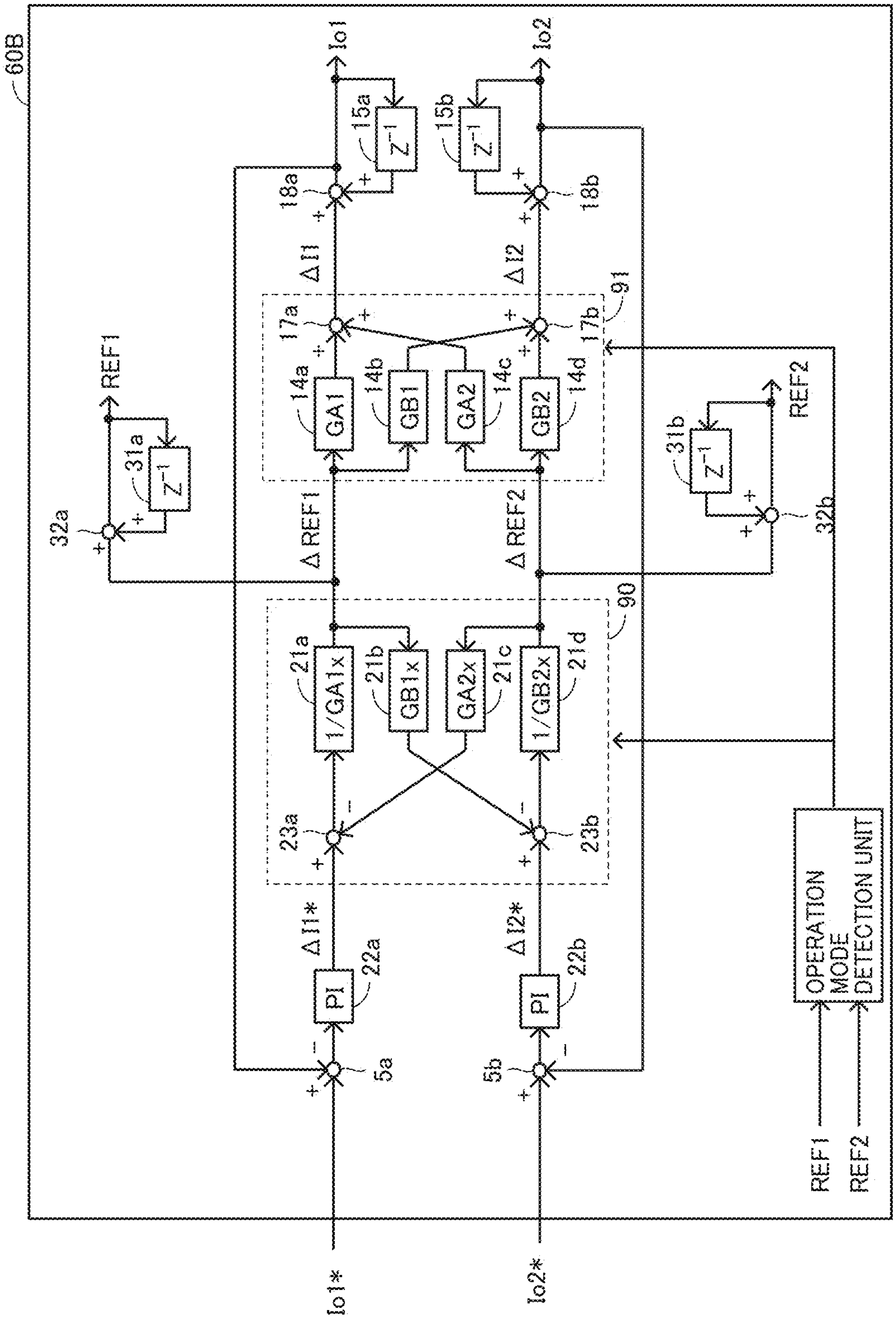
FIG. 25 is a diagram illustrating a detailed configuration of a current control unit 60B.

FIG. 25 is a diagram illustrating a detailed configuration of current control unit 60B.

Current control unit 60B includes subtractors 5*a* and 5*b*, PI control units 22*a* and 22*b*, a gain computing unit 91, an operation mode detection unit 80, a gain compensation unit 90, adders 18*a* and 18*b*, delay units 15*a* and 15*b*, adders 32*a* and 32*b*, and delay units 31*a* and 31*b*.

Subtractor 5*a* subtracts detection value Io1 of current detector CT1 from first current target value Io1* to calculate a first current deviation ΔIo1=Io1*−Io1. Subtractor 5*b* subtracts detection value Io2 of current detector CT2 from second current target value Io2* to calculate a second current deviation ΔIo2=Io2*−Io2.

PI control unit 22*a* proportionally integrates first current deviation ΔIo1 from subtractor 5*a* to generate a target value ΔI1* of the amount of change in the first current. PI control unit 22*b* proportionally integrates first current deviation ΔIo1 from subtractor 5*b* to generate a target value ΔI2* of the amount of change in the second current.

Gain computing unit 91 includes gain GA1 (14*a*), gain GB1 (14*b*), gain GA2 (14*c*), gain GB2 (14*d*), and adders 17*a* and 17*b*, which are similar to those shown in FIG. 23.

Operation mode detection unit 80 detects an operation mode of converter 100A that is related to the controllability. When REF1 is equal to or greater than REF2, operation mode detection unit 80 determines the operation mode of converter 100A based on REF1 and dR (=REF1−REF2). When REF1 is less than REF2, operation mode detection unit 80 determines the operation mode of converter 100A based on REF2 and dR (=REF2−REF1).

Based on the operation mode, gain compensation unit 90 corrects target value ΔI1* of the amount of change in the first current and target value ΔI2* of the amount of change in the second current to generate ΔREF1 and ΔREF2.

Gain compensation unit 90 includes subtractors 23*a* and 23*b*, a gain 1/GA1*x* (21*a*), a gain GB1*x* (21*b*), a gain GA2*x* (21*c*), and a gain 1/GB2*x* (21*d*).

Subtractor 23*a* subtracts the output of gain GA2*x* (21*c*) from target value ΔI1* of the amount of change in the first current. Subtractor 23*b* subtracts the output of gain GB1*x* (21*b*) from target value ΔI2* of the amount of change in the second current.

Then, ΔREF1 is obtained from the result of multiplication of the output of subtractor 23*a* and gain 1/GA1*x* (21*a*). The result of multiplication of ΔREF1 and gain GB1*x* (21*b*) is sent to subtractor 23*b*.

Further, ΔREF2 is obtained from the result of multiplication of the output of subtractor 23*b* and gain 1/GA2*x* (21*d*). The result of multiplication of ΔREF2 and gain GB2*x* (21*c*) is sent to subtractor 23*a*.

Further, adder 17*a* adds the result of multiplication of ΔREF1 and gain GA1 (14*a*) and the result of multiplication of ΔREF2 and gain GA2 (14C) to thereby generate ΔI1. Adder 18*a* and delay unit 15*a* generate Io1 from ΔI1.

Adder 17*b* adds the result of multiplication of ΔREF1 and gain GB1 (14*b*) and the result of multiplication of ΔREF2 and gain GB2 (14*b*) to thereby generate ΔI2. Adder 18*b* and delay unit 15*b* generate Io2 from ΔI2.

Further, REF1 is obtained from ΔREF1 by adder 32*a* and delay unit 31*a*. REF1 is obtained from ΔREF1 by adder 32*a* and delay unit 31*a*.

Setting the values of compensation gains GA1*x*, GA2*x*, GB1*x*, and GB2*x* at the same values as those of GA1, GA2, GB1, and GB2 makes it possible to improve the control nonlinearity from ΔI1* to ΔI1 and the control nonlinearity from ΔI2* to ΔI2 in current control unit 60B.

In the present embodiment, two output ports are employed as voltage sources. However, in the case where power conversion device 1000B generates these voltage sources, the linear controllability of the output current is required in order to reduce the capacitance of the capacitor connected to an output end, and the configuration described in the second embodiment can alleviate the above-described problem.

Based on the relation described above, the effective value of each of Io1 and Io2 is smaller than the effective value of Iin in the case where the relation between Vin and Vo1, Vo2 and the degree of imbalance of the output current are determined in advance. Therefore, from the viewpoint of size reduction of the reactor, in accordance with the degree of imbalance, reactors Ls and Lt each desirably include a small core made using a conductor having a wire diameter smaller than that of Lp, and reactors Ls and Lt desirably have an inductance value approximately equal to that of Lp.

Further, the power transmission characteristics with respect to the phase shift amount are as represented by the expressions (2) to (4b), and the circuit waveform characteristics are as shown in FIGS. 13 to 22. Accordingly, different inductance values may be adopted for reactors Lp, Ls, and Lt for the purpose of changing the control characteristics and changing the loss characteristics.

Figure 26:
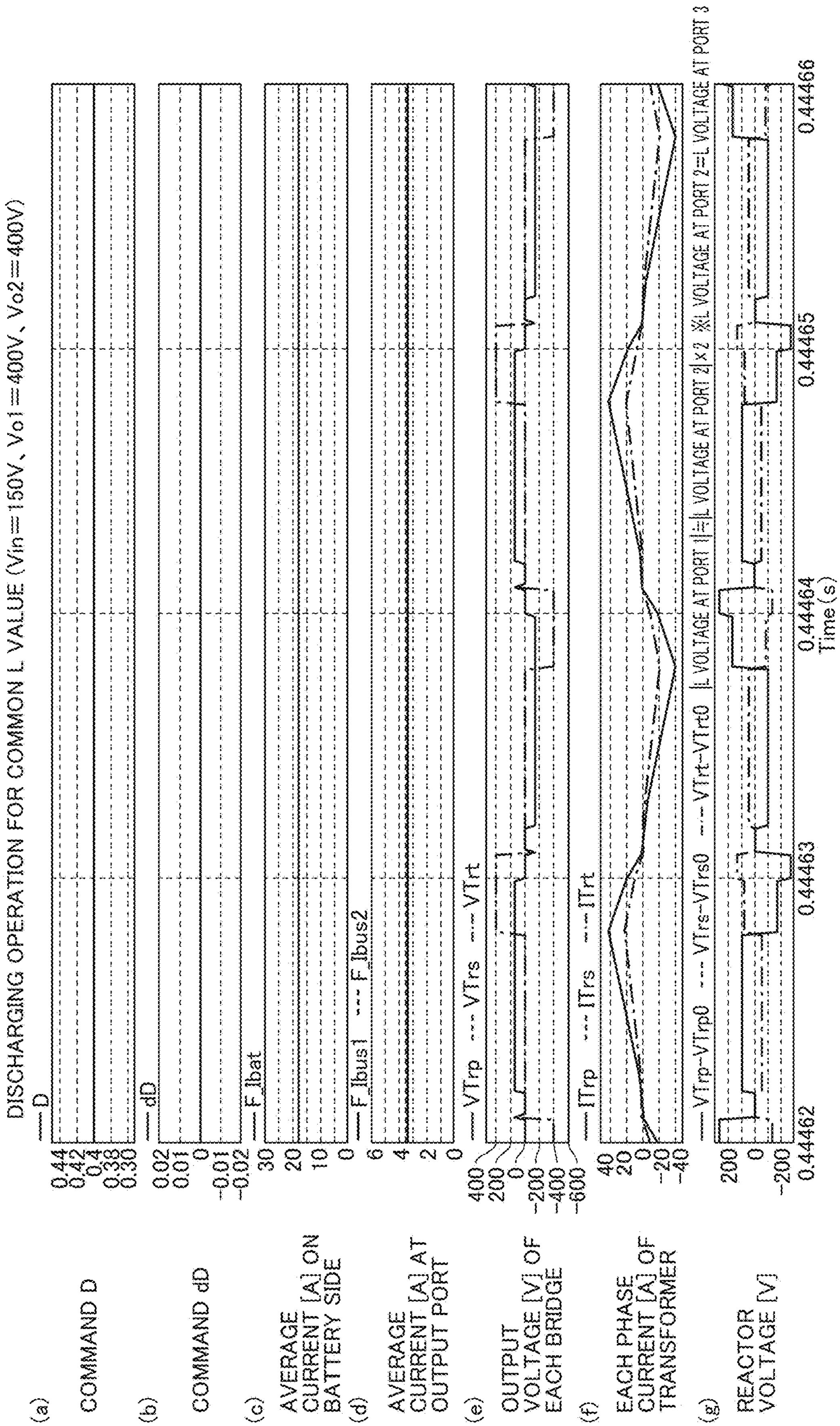
FIG. 26 is a diagram illustrating a waveform example of a discharging operation of a power conversion device under a condition for a common L value.
Figure 27:
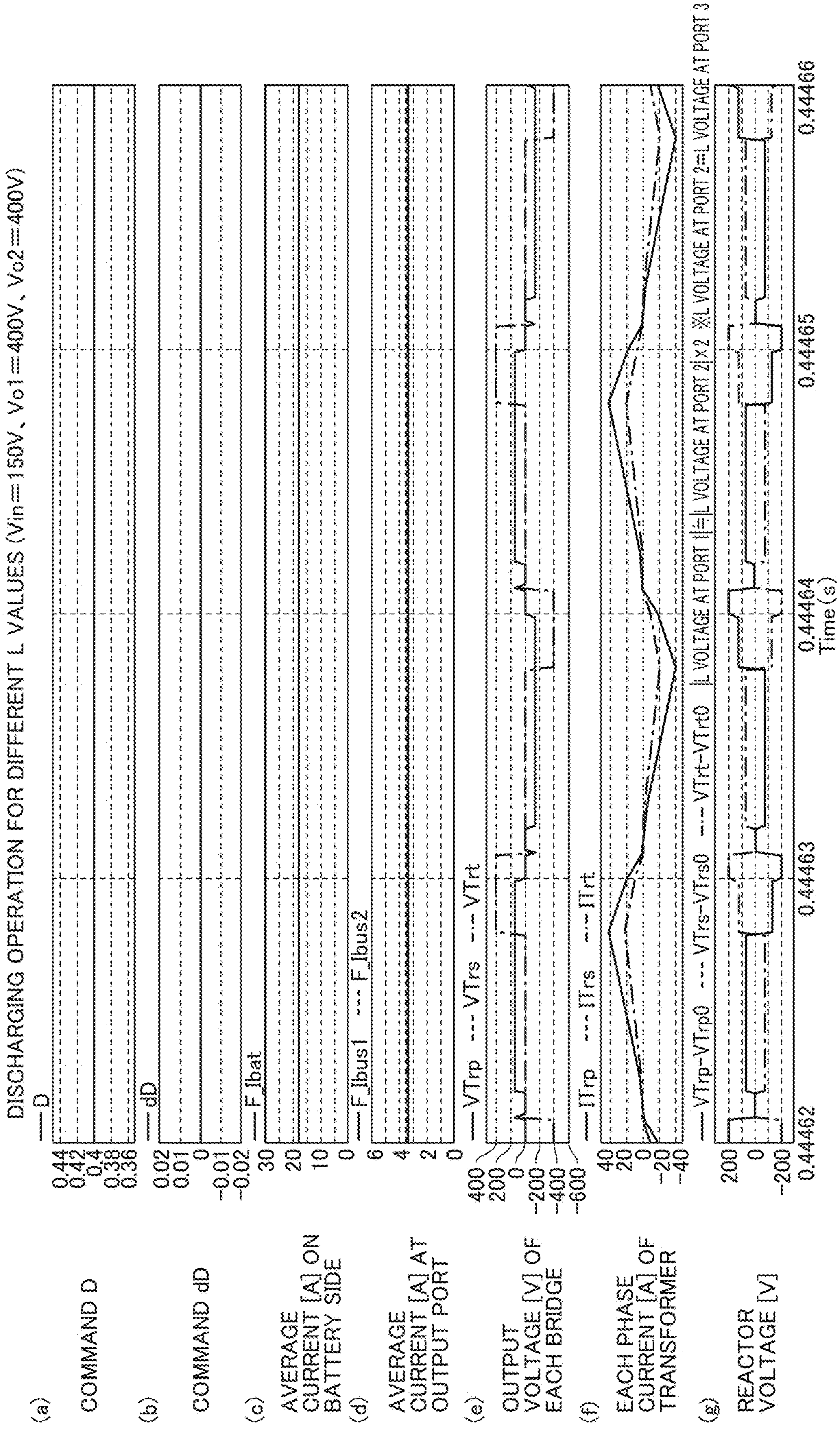
FIG. 27 is a diagram illustrating a waveform example of a discharging operation of the power conversion device under a condition for different L values.

FIG. 26 is a diagram illustrating a waveform example of a discharging operation of a power conversion device under a condition for a common L value. FIG. 27 is a diagram illustrating a waveform example of a discharging operation of the power conversion device under a condition for different L values.

The L value in FIG. 27 was set based on the L value in FIG. 26 defined as a reference L0 such that the L value for Lp was 0.75 times as large as L0, and the L value for each of Ls and Lt was 1.5 times as large as L0.

Referring to FIGS. 26 and 27, it can be seen that there is a difference in tendency of the application time of the voltage generated in the reactor between the condition for a common L value and the condition for different L values. When comparing the time products of the reactor voltages related to the iron loss in the reactor, it can be confirmed that the voltage time product of Lp is larger and the voltage time products of Ls and Lt are smaller under the condition for a common L value than under the condition for different L values.

In the case where Lp, Ls, and Lt are formed of the same magnetic component, the value of Lp is smaller than the value of Ls and the value of Lt under the condition for different L values as compared with the condition for a common L value.

In other words, it means that Lp is smaller than Ls and Lt in terms of the number of turns of the copper wire with respect to the magnetic component. Thus, the iron loss in Lp becomes large while the iron loss in Ls and Lt becomes small.

Therefore, when the reactor is designed based on the loss in Lp, the amount of heat generated in each of Ls and Lt is smaller than that in Lp, which leads to an increase in size of Ls and Lt. On the other hand, under the condition for different L values, the L values are distributed such that the voltage time products of Lp, Ls, and Lt are the same, which makes it possible to select two types of reactors made of the same magnetic component and undergoing the equal iron loss. Thus, under the condition for different L values, two types of reactors made of the same magnetic component and having different L values are required, but the maximum iron losses in Lp, Ls, and Lt are reduced as compared with those under the condition for a common L value. As a result, small magnetic components can be selected, so that the problem of size increase can be addressed for improvement.

As described above, the power conversion device according to the third embodiment can quantitatively adjust the power sharing by alleviating the nonlinearity of control in a converter having various operation modes. Therefore, the power conversion device according to the third embodiment can suppress the circulating power in a transformer of an insulated converter having the same number of DC buses as the number of phases in a multi-winding transformer, and also can quantitatively adjust the power sharing in a group of a plurality of discharge-type full-bridge circuits or a group of charge-type full-bridge circuits.

MODIFICATIONS

(1) First Modification

Figure 28:
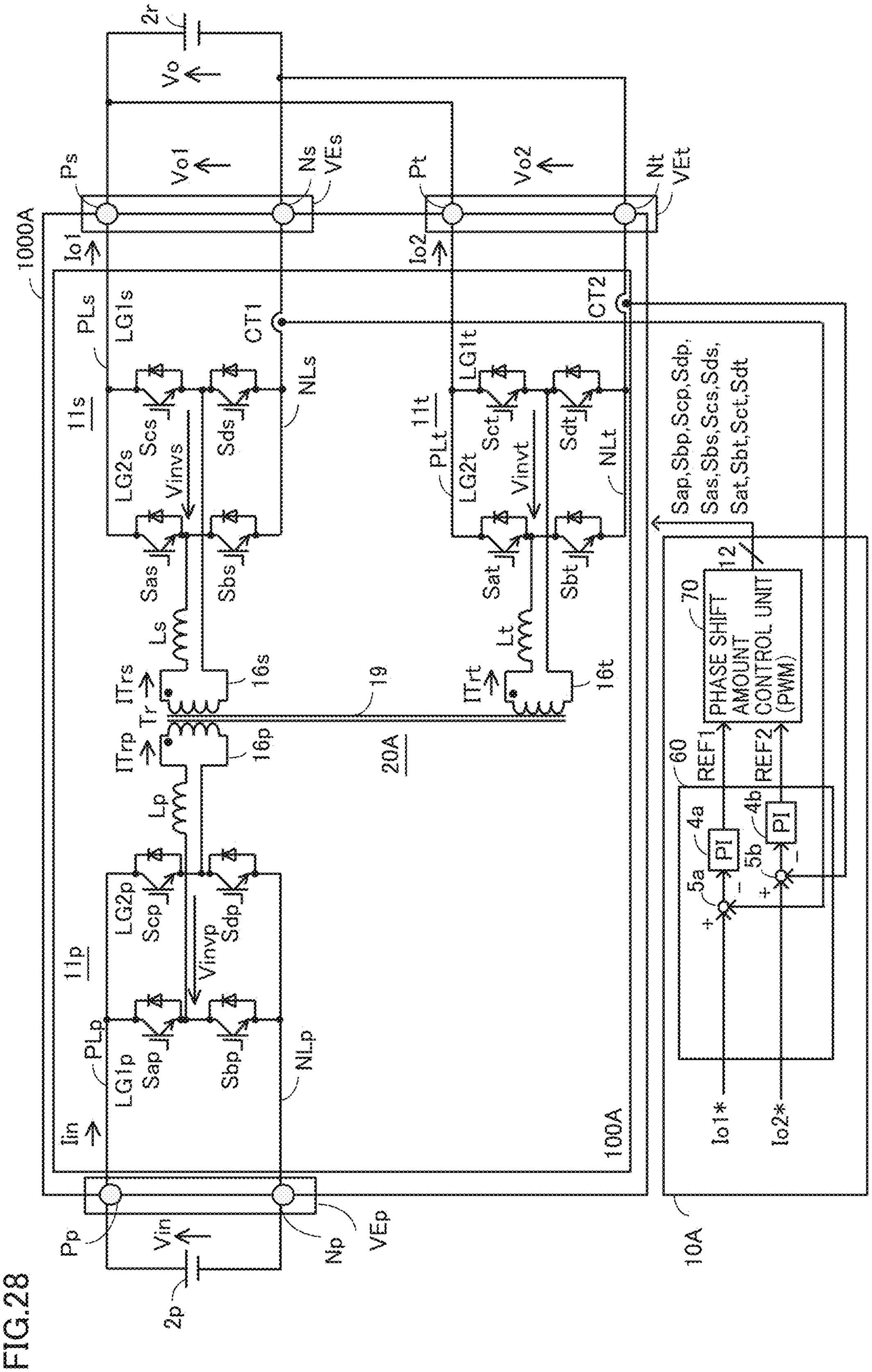
FIG. 28 is a schematic circuit diagram of a power conversion device 1000A according to a first modification.

FIG. 28 is a schematic circuit diagram of a power conversion device 1000A according to the first modification.

In the first modification, second DC voltage terminal VEs and third DC voltage terminal VEt are connected in parallel to a DC power supply 2*r*. Voltage Vo at DC power supply 2*r*, voltage Vo1 at second DC voltage terminal VEs, and voltage Vo2 at third DC voltage terminal VEt are equal to one another.

(2) Second Modification

Figure 29:
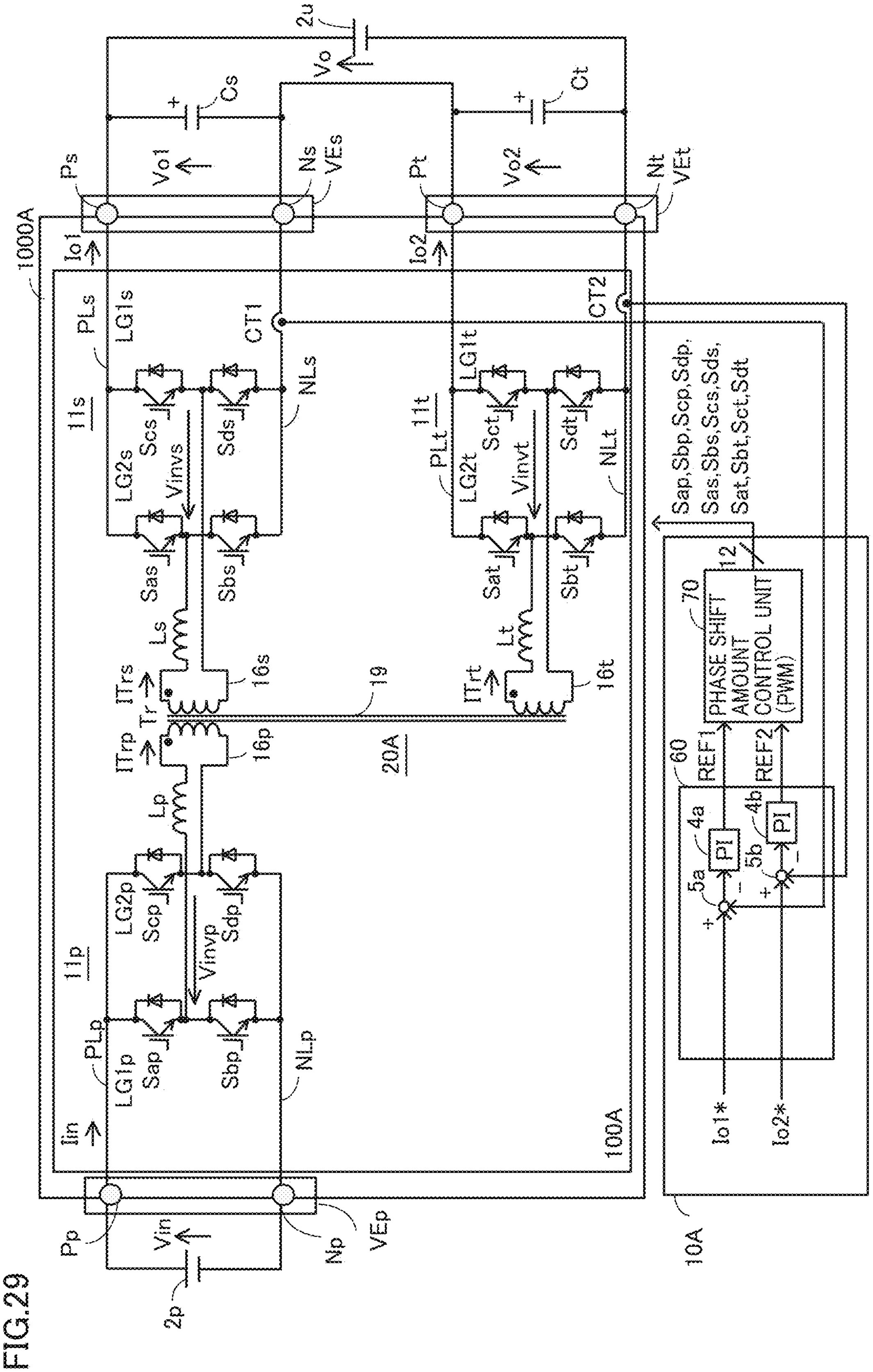
FIG. 29 is a schematic circuit diagram of a power conversion device 1000A according to a second modification.

FIG. 29 is a schematic circuit diagram of a power conversion device 1000A according to the second modification.

In the second modification, second DC voltage terminal VEs and third DC voltage terminal VEt are connected in series to a DC power supply 2*u*. Voltage Vo at DC power supply 2*u* is a sum of voltage Vo1 at second DC voltage terminal VEs and voltage Vo2 at third DC voltage terminal VEt.

(3) Third Modification

DC power supplies 2*s*, 2*t*, 2*r*, and 2*u* explained in the above description may be loads.

It should be understood that the embodiments disclosed herein are illustrative and non-restrictive in every respect. The scope of the present disclosure is defined by the scope of the claims, rather than the description above, and is intended to include any modifications within the meaning and scope equivalent to the scope of the claims.

REFERENCE SIGNS LIST

2-1, 2-M, 2-M+, 2-N, 2*p*, 2*s*, 2*t* DC power supply, 4*a*, 4*b*, 22*a*, 22*b* PI control unit, 5*a*, 5*b*, 12*a*, 12*b*, 23*a*, 23*b* subtractor, 10, 10A, 10B switching control unit, 11-1, 11-M, 11-M+, 11-N full-bridge circuit, 13*a*, 13*b*, 15*a*, 15*b*, 31*a*, 31*b* delay unit, 16-1, 16-M, 16-M+, 16-N, 16*p*, 16*s*, 16*t* winding, 17*a*, 17*b*, 18*a*, 18*b*, 32*a*, 32*b* adder, 19 core, 20, 20A multi-winding transformer, 60, 60B current control unit, 70 phase shift amount control unit, 80 operation mode detection unit, 90 gain compensation unit, 91 gain computing unit, 100, 100A converter, 500 control block diagram, 1000, 1000A, 1000B power conversion device, CT1, CT2 current detector, LG11, LG1M, LG1M+, LG1N, LG1*p*, LG1*s*, LG1*t* first leg, LG21, LG2M, LG2M+, LG2N, LG2*p*, LG2*s*, LG2*t* second leg, L1, LM, LM+, LN, Lp, Ls, Lt reactor, NL1, NLM, NLM+, NL, NLp, NLs, NLt, PL1, PLM, PLM+, PLN, PLp, PLs, PLt power line, Sa1, SaM, SaM+, SaN, Sap, Sas, Sat, Sb1, SbM, SbM+, SbN, Sbp, Sbs, Sbt, Sc1, ScM, SeM+, ScN, Scp, Scs, Sct, Sd1, SdM, SdM+, SdN, Sdp, Sds, Sdt semiconductor switching element GA1, GA1*x*, GA2, GA2*x*, GB1, GB1*x*, GB2, GB2*x* gain, VE1 to VEN, VEp, VEs, VEt DC voltage terminal, P1 to PN, N1 to NN, Pp, Np, Ps, Ns, Pt, Nt terminal.

The invention claimed is:

1. A power conversion device comprising:
N DC voltage terminals;
a converter; and
a switching control circuit to control switching of switching elements included in the converter, wherein
at least one of the N DC voltage terminals is connected to a DC power supply,
the converter includes
a multi-winding transformer having N (N≥3) windings, and
N full-bridge circuits each having a first leg, a second leg, and a reactor, each of the N full-bridge circuits being connected to a corresponding one of the DC voltage terminals and a corresponding one of the windings, and
the switching control circuit
switches switching elements in the first leg and the second leg, the first leg and the second leg being included in each of M (N−1≥M≥1) full-bridge circuits among the N full-bridge circuits,
switches switching elements in the second leg included in each of (N−M) full-bridge circuits that remain, and
stops switching of switching elements in the first leg included in each of the (N−M) full-bridge circuits;
wherein the switching control circuit includes a current control circuit to generate a command related to switching in such a manner that a current target value is adjusted for each of the full-bridge circuits in power transmission for charging/discharging through the multi-winding transformer,
based on the command related to switching, the switching control circuit detects an operation mode representing a characteristic of transmission and reception of electric power through the multi-winding transformer,
the switching control circuit includes a gain compensation circuit to correct the command related to switching based on the detected operation mode.

2. The power conversion device according to claim 1, wherein
the N DC voltage terminals include a first DC voltage terminal, a second DC voltage terminal, and a third DC voltage terminal, the first DC voltage terminal being connected to a first DC power supply,
the multi-winding transformer includes a first winding, a second winding, and a third winding,
the converter performs
DC/DC conversion involving power transmission from the first DC voltage terminal to the second DC voltage terminal and the third DC voltage terminal, or
DC/DC power conversion involving power transmission from the second DC voltage terminal and the third DC voltage terminal to the first DC voltage terminal,
the N full-bridge circuits include
a first full-bridge circuit connected to the first DC voltage terminal and the first winding,
a second full-bridge circuit connected to the second DC voltage terminal and the second winding, and
a third full-bridge circuit connected to the third DC voltage terminal and the third winding,
the multi-winding transformer is connected to the first full-bridge circuit, the second full-bridge circuit, and the third full-bridge circuit, and
the switching control circuit
generates a first command value for adjusting a first current flowing through the second DC voltage terminal to be set at a first current target value, and a second command value for adjusting a second current flowing through the third DC voltage terminal to be set at a second current target value,
controls switching of switching elements included in the first full-bridge circuit, the second full-bridge circuit, and the third full-bridge circuit based on the first command value and the second command value,
when electric power is output from the first DC power supply to the first DC voltage terminal, stops switching of the switching elements in the first leg included in the second full-bridge circuit and the switching elements in the first leg included in the third full-bridge circuit, and
when electric power is output from the first DC voltage terminal to the first DC power supply, stops switching of the switching elements in the first leg included in the first full-bridge circuit.

3. The power conversion device according to claim 2, wherein
the switching control circuit includes an operation mode detection circuit to
determine an operation mode of the converter based on the first command value and a difference value between the first command value and the second command value when the first command value is equal to or greater than the second command value, and
detect the operation mode of the converter based on the second command value and a difference value between the first command value and the second command value when the first command value is less than the second command value.

4. The power conversion device according to claim 3, wherein
the switching control circuit includes a gain compensation circuit to
correct a target value of an amount of change in the first current and a target value of an amount of change in the second current based on the detected operation mode, and
generate an amount of change in the first command value and an amount of change in the second command value.

5. The power conversion device according to claim 1, wherein, among N reactors included in the N full-bridge circuits, at least one reactor and the other reactors are made of the same magnetic component and have different L values.

6. The power conversion device according to claim 5, wherein N reactors are configured to have the same voltage time products.

7. The power conversion device according to claim 1, wherein the characteristic includes whether each full-bridge circuit performs a discharging operation or a charging operation and a number of levels of an output voltage of each full-bridge circuit.

* * * * *